US010885803B2

(12) United States Patent
Brown et al.

(10) Patent No.: US 10,885,803 B2
(45) Date of Patent: Jan. 5, 2021

(54) SYSTEM AND METHOD FOR REAL-TIME ANALYSIS AND GUIDANCE OF LEARNING

(71) Applicant: Massachusetts Institute of Technology, Cambridge, MA (US)

(72) Inventors: Emery Neal Brown, Brookline, MA (US); Demba Ba, Cambridge, MA (US); Anne Caroline Smith, Winchester, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 994 days.

(21) Appl. No.: 14/603,593

(22) Filed: Jan. 23, 2015

(65) Prior Publication Data
US 2016/0217701 A1   Jul. 28, 2016

(51) Int. Cl.
*G09B 7/00*   (2006.01)
(52) U.S. Cl.
CPC ..................... *G09B 7/00* (2013.01)
(58) Field of Classification Search
CPC .......................................................... G09B 7/08
See application file for complete search history.

(56) References Cited

U.S. PATENT DOCUMENTS

| 5,059,127 A | 10/1991 | Lewis et al. |
| 6,832,069 B2 * | 12/2004 | Stout ............... G09B 23/02 434/353 |
| 7,828,552 B2 | 11/2010 | Shute et al. |
| 8,798,518 B2 | 8/2014 | Almond et al. |
| 2004/0018479 A1 * | 1/2004 | Pritchard ........... G09B 7/02 434/350 |

(Continued)

FOREIGN PATENT DOCUMENTS

WO   01/04862 A2   1/2001

OTHER PUBLICATIONS

Psychometrika, Sep. 1989, vol. 54, No. 3, pp. 451-466, "A Stochastic Growth Model Applied to Repeated Tests of Academic Knowledge", ALBERS, et al.

(Continued)

*Primary Examiner* — Xuan M Thai
*Assistant Examiner* — Sadaruz Zaman
(74) *Attorney, Agent, or Firm* — Nields, Lemack & Frame, LLC

(57) ABSTRACT

The present disclosure features systems and methods for analyzing student learning and calibrating the difficulty of questions on a test or examination. In one embodiment, a method for analyzing the learning of a student includes administering, by an assessment agent, a task to a student, the task comprising a question having an associated difficulty. The assessment agent receives a response to the question from the student and evaluates the response to generate an observable, the observable comprising information related to the response. A posterior determination of the student's ability is then calculated by incorporating the observable into an ability model associated with the student, and the posterior determination of ability may be compared with the difficulty of the question, a skill acquisition probability, or other measure. The student's response, or a plurality of responses from students within a cohort, may be used to determine the difficulty of each question.

18 Claims, 6 Drawing Sheets

(56) References Cited

U.S. PATENT DOCUMENTS

| | | | |
|---|---|---|---|
| 2005/0221266 A1 | 10/2005 | Mislevy et al. | |
| 2006/0286533 A1* | 12/2006 | Hansen | G09B 7/02 |
| | | | 434/323 |
| 2007/0009871 A1 | 1/2007 | Tidwell-Scheuring et al. | |
| 2007/0122789 A1 | 5/2007 | Yoo | |
| 2009/0178114 A1 | 7/2009 | Susser | |
| 2010/0190142 A1* | 7/2010 | Gal | G09B 5/00 |
| | | | 434/322 |
| 2011/0143328 A1 | 6/2011 | Brusher | |
| 2013/0204625 A1* | 8/2013 | Aicher | G10L 25/66 |
| | | | 704/270 |
| 2014/0170626 A1* | 6/2014 | Lovett | G09B 5/00 |
| | | | 434/350 |
| 2014/0272914 A1* | 9/2014 | Baraniuk | G09B 7/00 |
| | | | 434/362 |
| 2016/0203726 A1* | 7/2016 | Hibbs | G09B 5/06 |
| | | | 434/308 |

OTHER PUBLICATIONS

Whitepaper, Unpublished, Feb. 1, 2012, pp. 1-3, "Online Learning Initiatives Can Provide a Window into the Dynamics of Human Learning", Massachusetts Institute of Technology, Demba BA.

PhD Dissertation, Massachusetts Institute of Technology, Jun. 2011, pp. 1-118, "Algorithms and Inference for Simultaneous-Event Multivariate Point-Process, with Applications to Neural Data", Demba BA.

Journal of Educational and Behavioral Statistics, Aug. 2011, vol. 36, No. 4, pp. 491-522, "Assessment of School Performance Through a Multilevel Latent Markov Rasch Model", Bartolucci, et al.

Psychometrika, Jun. 1970, vol. 35, No. 2, pp. 179-197, "Fitting a Response Model For n Dichotomously Scored Items", Bock, et al.

Psychometrika, Jun. 1999, vol. 64, No. 2, pp. 153-168, "A Bayesian Random Effects Model for Testlets", Bradlow, et al.

The Journal of Neuroscience, Sep. 15, 1998, vol. 18 No. 18, pp. 7411-7425, "A Statistical Paradigm for Neural Spike Train Decoding Applied to Position Prediction from Ensemble Firing Patterns of Rat Hippocampal Place Cells", Brown, et al.

Psychometrika, Dec. 2008, vol. 73, No. 4, pp. 533-559, "Random Item IRT Models", De Boeck, et al.

Psychometrika, Sep. 1991, vol. 56, No. 3, pp. 495-515, "A Multidimensional Latent Trait Model For Measuring Learning and Change", Embretson.

Journal of Educational Computing Research, 1992, vol. 8 No. 2, pp. 187-213, "Computerized Adaptive Mastery Tests As Expert Systems", Frick.

Psychometrika, Sep. 1986, vol. 51, No. 3, pp. 357-373, "Conjunctive Item Response Theory Kernels", Jannarone.

Educational Psychology Measurement, 1953, vol. 13, pp. 517-549, "The Relation of Test Score to the Trait Underlying the Test", Lord.

Proceedings of the Fourth Berkeley Symposium on Mathematical Statistics and Probability, 1961, vol. IV: Contributions to Biology and Problems of Medicine, pp. 321-333, U. Calif. Press, Berkeley, CA, "On General Laws and the Meaning of Measurement in Psychology", Rasch.

Journal of Educational and Behavioral Statistics, Winter 2003, vol. 28, No. 4, pp. 295-313, "Calibrating Item Families and Summarizing the Results Using Family Expected Response Functions", Sinharay, et al.

Neural Computation, May 2003, vol. 15, No. 5 pp. 965-991, "Estimating a State-Space Model from Point Process Observations", Smith, et al.

The Journal of Neuroscience, Jan. 14, 2004, vol. 24, No. 2, pp. 447-461, "Dynamic Analysis of Learning in Behavioral Experiments", Smith, et al.

Psychometrika, Dec. 1987, vol. 52, No. 4, pp. 589-617, "A Nonparametric Approach for Assessing Latent Trait Unidimensionality", Stout.

Psychometrika, Jun. 1990, vol. 55, No. 2, pp. 293-325, "A New Item Response Theory Modeling Approach With Applications to Unidimensionality Assessment and Ability Estimation", Stout.

Journal of Educational and Behavioral Statistics, Summer 1999, vol. 24, No. 2, pp. 208-223, "Approximations of Normal IRT Models for Change", Tan, et al.

Educational and Psychological Measurement, Feb. 2006, vol. 66, No. 1, pp. 5-34, "Application of Multidimensional Item Response Theory Models to Longitudinal Data", Te Marvelde, et al.

PhD Dissertation, Duke University, 2012, 159 pages, "Bayesian Modeling Using Latent Structures", Xiaojing Wang.

The Annals of Applied Statistics, 2013, vol. 7, No. 1, pp. 126-153, (reprint of original article, 29 pages), "Bayesian Analysis of Dynamic Item Response Models in Educational Testing", Wang, et al.

Science, Jun. 6, 2003, vol. 300, pp. 1578-1581, "Single Neurons in the Monkey Hippocampus and Learning of New Associations", Wirth, et al.

International Search Report and Written Opinion dated Mar. 17, 2016 in co-pending PCT application No. PCT/US2016/0134046.

Reddy et al, "Latent Skill Embedding for Personalized Lesson Sequence Recommendation," Cornell University, Feb. 23, 2016.

Prerau et al., "A Mixed Filter Algorithm for Cognitive State Estimation from Simultaneously Recorded Continuous Binary Measures of Performance," Biological Cybermetrics, vol. 99, Iss. 1, pp. 1-14, Jul. 2008.

Canadian communication dated Nov. 27, 2017 in corresponding Canadian patent application No. 2,917,447.

\* cited by examiner

SYSTEM AND METHOD FOR REAL-TIME ANALYSIS AND GUIDANCE OF LEARNING

FIELD OF THE DISCLOSURE

The present disclosure generally relates to systems and methods for performing an analysis of learning. In particular, the present disclosure relates to systems and methods for performing analysis and guidance of learning in real-time, which may be utilized in an on-line learning environment.

BACKGROUND

On-line learning is an expanding market in all areas of education. Courses available on-line include various subjects and fields, including reading, mathematics, and science courses at different educational levels; preparation courses for various examinations, such as the SAT, ACT, GRE, AMCAS, and the LSAT; and also courses for professional certification examinations, such as state bar examinations and medical specialty examinations. Various on-line universities, such as the University of Phoenix and Kaplan University, have sprung up to offer on-line learning and education to the masses. Not to be outdone by their on-line counterparts, many traditional and established universities have expanded their services to offer on-line educational programs. For example, the MIT EdX program, which is a consortium among MIT, Harvard University, and the University of California at Berkeley, offers various on-line courses related to science and engineering. Further, Stanford University opens many of its courses to on-line learning via the Stanford Center for Professional Development.

The benefits of on-line learning are manifest. On-line learning allows students to master skills, concepts, or an entire body of knowledge at their own pace. Coursework can be performed anywhere and whenever is convenient, such as in the privacy of one's own home, in the library, or even while riding the subway. Thus, on-line learning creates countless educational opportunities for those who may not have the resources available for a traditional educational experience to nevertheless better themselves and expand their horizons.

Often, on-line education seeks to duplicate the traditional educational experience. Thus, students may view recorded lectures, turn in homework, and undertake examinations via a computer. But on-line learning typically lacks the personal instructional and social experiences associated with live education and coursework, and thus on-line students may be at a disadvantage compared to other students in a class. On-line students may become overwhelmed by the content of a course, and have no true recourse other than abandoning the effort. Clarification regarding the skills, concepts, and bodies of knowledge to be taught may not be immediately evident from a hastily drafted syllabus. Moreover, the chief means of determining student ability, i.e. a static examination administered to students at various times during the course, typically does not serve any immediate instructive function. Traditional education views an examination as a competition between the student and the test, rather than as a means to further instruct the student.

On-line learning may be improved by further analysis and characterization of the learning process. For example, formal characterization of learning has been previously explored, in particular, using item response theory (IRT). IRT supposes that the probability of a correct response to an item on a test is a mathematical function of person and item parameters, such as intelligence and difficulty. Formal statistical analyses of student responses that apply IRT have been used to construct scales of learning, as well as to design and calibrate standardized tests. However, IRT approaches depend critically on static statistical models and analyses which lend themselves to analyses of student learning only when a test is complete, as opposed to during the test itself. Further, IRT approaches only define student ability and question difficulty indirectly.

Accordingly, there is a need for improvements in on-line education and learning.

SUMMARY

The problems of the prior art are addressed by a novel paradigm for learning that can be used to assess learning in real-time. The paradigm differs from previous approaches in that it directly defines both the difficulty of questions and the ability of students. Estimates of both question difficulty and student ability may be efficiently determined after each question on a test, allowing for both real-time usage and analysis during the test, and retrospective analyses of student ability as student ability evolves over time. Real-time estimates may be compared to determine whether a student has learned or mastered tested material after each question, or simply to provide a current estimate of the student's ability on a continuous scale. Further, questions may be chosen in real-time with specified levels of difficulty or related to different skills or areas in order to better guide learning in an on-line environment. Moreover, the paradigm allows students to use all features of an on-line learning system locally to ensure the privacy of their responses. However, where privacy is not a concern, information may be pooled from students in similar groups to evaluate group learning and performance.

In one embodiment, a method for analyzing the learning of a student includes the use of an assessment agent executing on a processor to administer a task to a student, the task comprising a question having an associated difficulty. A response to the question is received and the assessment agent evaluates the response to generate an observable. The observable comprises information related to the response, which may be information representing whether the student has supplied a correct response or an incorrect response. A posterior estimate of the student's ability is then calculated by incorporating the observable into an ability model that models the student's ability. The student's ability may comprise the probability that the student will provide a correct response to the question. This posterior estimate may then be compared with the difficulty of the question to determine whether the student has acquired a skill or mastered the material. The difficulty of the question may comprise the probability that a plurality of students will provide a correct response to the question. In turn, the assessment agent may decide to submit tasks comprising questions having different levels of difficulty or questions related to different skills, or decide to take other actions in response.

BRIEF DESCRIPTION OF THE DRAWINGS

FIG. 2 is a block diagram illustrating another embodiment of a learning system according to the disclosure;

FIG. 3 is a block diagram illustrating a framework for a learning system that may be used for assessing the difficulty of questions and for assessing the ability of students;

FIG. 4 is a flow diagram illustrating an embodiment of a method of estimating the difficulty of a question;

FIG. 5 is a flow diagram illustrating an embodiment of a method of comparing a posterior estimate of the ability of a student with the difficulty of a question;

FIG. 6 is a flow diagram illustrating an embodiment of a method of determining whether a student has acquired a skill.

DETAILED DESCRIPTION

Figure 1:
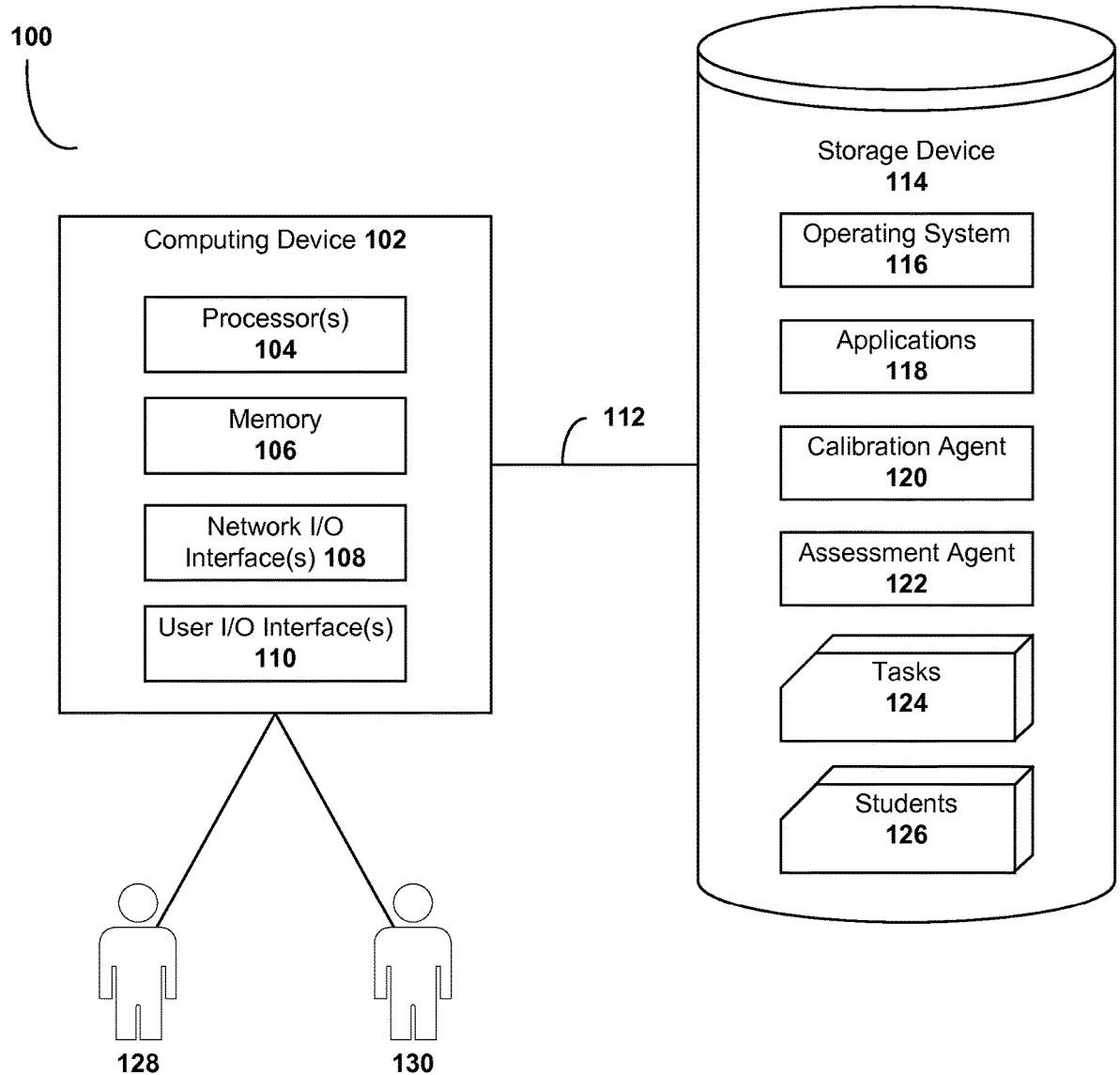
FIGS. 1 through 6, wherein like parts are designated by like reference numerals throughout, illustrate an example embodiment of a system and method for the implementation of a learning and analysis system. Although the present disclosure describes the system and method with reference to the example embodiments described in the figures, it should be understood that many alternative forms can embody the present disclosure. One of ordinary skill in the FIG. 1 is a block diagram illustrating a learning system according to an embodiment of the disclosure.

The present disclosure features a novel approach and paradigm for analyzing student learning and performance. The disclosure features systems and methods for determining the difficulty of questions, assessing student ability, and determining whether a student has mastered or acquired a skill or set of skills. The systems and methods may be performed in real-time, and have applications in various settings, including on-line and electronic learning environments. In various embodiments, the systems and methods may provide a real-time assessment of learning which may comprise: precise definitions of question difficulty and student ability; tracking performance after each question; a precise definition of skill acquisition based on analyses of student performance; choosing questions in real-time with specified levels of difficulty to better guide learning; assessing the difficulty level of a question; allowing students to use embodiments while maintaining privacy; and pooling information across cohorts to evaluate group performance.

The term "student" is used throughout the specification. It is to be understood that the term "student" is intended to be interpreted broadly, and may comprise any person, entity, or agent who interacts with a learning system or learning systems according to the disclosure. For example, a student may be a person who takes an examination, assessment, or test.

Various embodiments of the disclosure exploit the power of Bayesian analysis to determine the difficulty of test questions or items and to determine the ability of a student, examinee, or other entity responding to a test question or item. The determination may be made in real-time as a student responds to each test question or item. The determination may be made from the properties of a probability distribution, probability distribution function, or probability density. For example, an expected value or estimate of a probability distribution may provide an estimate of difficulty of a question, and the variance of the distribution may provide a certainty for that estimate. The mode of the distribution, or an appropriate quantile of the distribution, such as the median or 30th percentile, may also be used to determine the estimate.

In various embodiments, the ability of a student or examinee may be represented as a probabilistic measure that the student will provide a correct response to a given question. As the student responds to each question, the resulting response may be scored to generate an observable, or evidence, regarding the student's ability. The observable may then be used to update a model representing a prior distribution or estimate of the student's ability before responding to the question to generate a posterior distribution or estimate of the student's ability after responding to the question. Similarly, the difficulty of a question or item on a test can be represented as a probabilistic measure that a student or group of students will provide a correct response. An observable may then be used to update a model comprising a prior distribution or estimate of the difficulty of a question before the student responds to the question to generate a posterior distribution or estimate of the difficulty of the question after the student responds to the question. In this way, the systems and methods disclosed herein exploit the power of Bayesian inference and analysis so that precise determinations and estimates of student ability and question difficulty may be obtained. Further, the systems and methods may further be used to analyze how students learn and how student ability may change over time. Thus, the present disclosure features a novel paradigm for learning and education that has myriad advantages, especially in an on-line, dynamic, and real-time learning environment.

Further, the detailed description set forth below in connection with the appended drawings is intended as a description of embodiments and does not represent the only forms which may be constructed and/or utilized. However, it is to be understood that the same or equivalent functions and sequences may be accomplished by different embodiments that are also intended to be encompassed within the spirit and scope of the disclosure.

Exemplary Learning Systems

FIG. 1 is a block diagram illustrating an example embodiment of a learning system 100 suitable for practicing exemplary embodiments of the present disclosure. The learning system 100 may be used for administering examinations, calibrating the difficulty of questions, and for analyzing the learning and performance of students and cohorts. The learning system 100 comprises a computing device 102, which may include processor(s) 104, memory 106, network input/output (I/O) interfaces 108, and user I/O interfaces 110. The learning system 100 may further comprise a storage device 114, such as a hard-drive, flash-drive, DVD, or CD-ROM, for storing an operating system 116 and other software programs. These software programs include applications 118, which may further comprise a calibration agent 120 and an assessment agent 122. Storage device 114 may also store information related to a plurality of tasks (tasks 124) and information related to a plurality of students (students 126). The storage device 114 may be connected to the computing device 102 by a communications link 112. End users, such as a student 128 and an administrator 130, may also interact with the computing device 102 in order to create tests, calibrate questions, administer tests, or perform any other function associated with the learning system 100.

Depending on particular implementation requirements of the present disclosure, the computing device 102 may be any type of computing system, such as a workstation, server, desktop computer, laptop, handheld computer, cell phone, mobile device, tablet device, personal digital assistant, networked game or media console, or any other computing device or system. The computing device 102 may have sufficient processing power and memory capacity to perform all or part of the operations described herein, or alternately may only serve as a proxy, with some or all functions performed externally by a server or other computing device. In some embodiments, all or parts of the computing device 102 may be wearable, e.g., as a component of a wrist watch, smart glasses, or other article of clothing. The computing device 102 may be embodied as a stand-alone system, or as a component of a larger electronic system within any kind of environment, such as a conference room, classroom, educational testing center, vehicle, office, or home. In certain embodiments, the learning system 100 may comprise multiples of computing devices 102.

The processor(s) 104 may include hardware or software based logic to execute instructions on behalf of the computing device 102. For example, depending on specific implementation requirements, the processor(s) 104 may include a microprocessor; single or multiple cores for executing software stored in the memory 106; or other hardware of software components for controlling the computing device 102. The processor(s) 104 may be in communication with other components of the learning system 100, such as the memory 106, network I/O interfaces 108, user I/O interfaces 110, and storage device 114, for example, via a local bus.

The computing device 102 may access an external network or other computing devices via one or more network I/O interfaces 108. The network I/O interfaces 108 allow the computing devices 102 to communicate with other computers or devices, and may comprise either hardware or software interfaces between equipment or protocol layers within a network. For example, the network I/O interfaces 108 may comprise Ethernet interfaces, frame relay interfaces, cable interfaces, DSL interfaces, token ring interfaces, wireless interfaces, cellular interfaces, serial interfaces, fiber optic interfaces, and the like.

An end user, such as the student 128 or administrator 130, may interact with the computing device 102 and learning system 100 via one or more user I/O interfaces 110. The user I/O interfaces 110 may comprise any combination of input or output devices that allow an end user to interact with the computing device 102. For example, input devices may comprise a keyboard, touchscreen, microphone, camera, mouse, touchpad, trackball, five-way switch, joystick, and/or any combination thereof. Output devices may comprise a screen, speaker, printer, and/or any combination thereof. Thus, the student 128 or administrator 130 may interact with the computing device 102 by speaking, tapping, gesturing, clicking, typing, or using a combination of multiple input modes. In turn, the computing device 102 or other component may respond with any combination of visual, aural, or haptic output. The computing device 102 may manage the user I/O interfaces 110 and provide a user interface to the end user by executing a stand-alone application (e.g., one of the applications 118) residing in the storage device 114. Alternately, a user interface may be provided by an operating system 116 executing on the computing device 102.

The storage device 114 may be any form of storage, such as a hard disk, solid state drive, flash drive, DVD, CD-ROM, or cloud-based storage. The computing device 102 may access the storage device 114 via the communications link 112, which may comprise any form of electrical communication, including TCP/IP over a LAN or WAN network, or a direct connection such as USB or SATA. The communications link 112 may also simply be a local bus through which various components of the computing device 102 communicate. Accordingly, in certain embodiments, the computing device 102 and storage device 114 are housed within the same enclosure. However, in other embodiments, the computing device 102 and storage device 114 may be housed separately. In certain embodiments, several storage devices 114 may be used in the learning system 100. For example, various components of the storage device 114 may be distributed or duplicated between a local storage device residing on the computing device 102, and an external storage device accessed via a network or other communication means.

The applications 118, calibration agent 120, and assessment agent 122 may run on the operating system 116, which may comprise any of the versions of the conventional operating systems, any embedded operating system, any real-time operating system, any open source operating system, any proprietary operating system, any operating systems for mobile computing devices, any thin-client operating system, or any other operating system capable of running on the computing device 102 and performing part or all of the operations described herein. Further, the operating system 116, applications 118, calibration agent 120, and assessment agent 122 may in some instances be accessed or run from a bootable CD, thumb drive, or from a network.

The storage device 114 may also store a plurality of information items related to the learning system 100, such as information related to a plurality of tasks (tasks 124) and information related to a plurality of students (students 126). A task may be the most obvious component of an assessment, examination, or test. A task may include a question that elicits a simple response, such as a selection of an answer to the question. Scoring the simple response, for example, as either correct or incorrect, yields a single independent observation, or observable. Accordingly, information related to a plurality of tasks 124 may include, without limitation, a question, the difficulty of the question, a set of potential responses, a correct answer, the time at which the question was taken, and a skill that the question relates to. Though an observable may be referred to in a singular fashion, an observable may also refer to a plurality of observables, e.g., a vector or array of scored responses.

A student, such as the student 128, may be any person, entity, or agent who interacts with the learning system 100 to undertake an examination, assessment, or test. For example, the student 128 may be a person enrolled in an on-line learning course who has provided a response to a presented question or item on a test or other interaction with the learning system 100. However, the student 128 may also be any person or individual that interacts with the learning system 100 in some way. In some embodiments, the student 128 may also be a simulated entity or other agent; for example, a simulated student 128 may be useful for providing additional students in an on-line learning course or for the testing of various components of the learning system 100. The student 128 interacts with a task to produce an observable by providing a response to the question. A student 128 may interact directly with the computing device 102 via the user I/O interfaces 110 and/or the operating system 116 to undertake examinations or tests. Alternately, the student 128 may undertake an examination or test off-site, such as in a classroom, home office, or other environment, and the responses may then be transferred to the computing device 102 for processing. A student 128 may also interact with a specialized application in order to use various components of the learning system 100. Information related to a plurality of students 126 may include, without limitation, demographic information, enrollment, whether the student belongs to a particular group, class, or cohort(s), and information describing previous encountered tasks and the corresponding questions and responses provided by the student 128.

Further, in certain embodiments, portions of the storage device 114 and learning system 100 may also store any other kind of information that may be related to learning and education. For example, the storage device 114 may include information related to the selection of questions for a plurality of tests, a body of knowledge, course information, curricula, enrollment information, learning materials, lectures, and the like. Information may be stored and organized in any manner or format, such as within a relational database, or as a simple flat-file.

An administrator, such as the administrator 130, may be any person, agent, or entity who interacts with the learning system 100 to analyze learning. The administrator 130 may configure or administer various components of the learning system 100. The administrator 130 may also comprise a teacher or instructor for a given course or class offered or administered by the learning system 100. For example, the administrator 130 may interact with the learning system 100 to define or calibrate the difficulty of questions, create tests, administer tests, score tests, analyze student performance and question difficulty over time, provide teaching materials, record lectures, organize classes or instruction sessions, and perform other housekeeping and regulatory functions associated with the learning system 100. Part or all of the functions performed by the administrator 130 may be automated. For example, these functions may be embodied as additional applications 118 executing on the computing device 102.

Applications 118 may comprise any kind of application, and may communicate and exchange data with other applications executing on the computing device 102. Applications 118 may include applications related to performing assessments, administering tests, estimating the difficulty of questions, determining student ability, tracking student performance, interacting with students, administrators, and other parties, and determining skill acquisition. Applications 118 may also include applications for administering examinations in an on-line or electronic learning environment, such as a web server with corresponding logic and code to administer questions and receive responses from a student.

As noted above, information related to a plurality of tasks 124 may include the estimated difficulty of a given question, which may be the estimate of a probability distribution or density representing the probability that a student or group of students will provide a correct response to the question. The calibration agent 120 may be configured to calibrate the estimated difficulty of questions and/or items prior to use by the learning system 100, and may comprise a library of logical and statistical code. The library may receive, for example, information regarding previous students and their responses to a question or set of questions. However, the calibration agent 120 may also calibrate the difficulty of questions and/or items in real-time during use by the learning system 100 as current students provide responses to a question or set of questions. As will be described in further detail below, question difficulty models and other parameters or variables may be retrieved from the library or other source and an estimate of the difficulty of a question may then be adjusted in response to the information received, creating a posterior estimate from a posterior distribution. Appropriate libraries may use an open implementation protocol that supports many different paradigms including, without limitation, such as Bayesian models, machine learning algorithms, likelihood-based algorithms, and neural network algorithms.

The assessment agent 122 is configured to perform an assessment of students interacting with the learning system 100. Accordingly, the assessment agent 122 may select tasks, administer a test, receive responses, generate observables, and evaluate the ability of a student with respect to the difficulty of a question or the content of a question. Similar to the calibration agent 120, the assessment agent 122 may also comprise a library of logic and statistical code and may receive, for example, information regarding a current student, the student's current response to a question, the student's previous responses to a set of questions, and an estimated value of the difficulty of each question. Student ability models and other parameters or variables may be retrieved from the library and an estimate of student ability may then be adjusted in response to the information received, creating a posterior estimate from a posterior distribution. Further, the assessment agent 122 may execute concurrently with the calibration agent 120, such that real-time estimates of both student ability and question difficulty may be determined after each response. As will be described in further detail below, the assessment agent 122 may then compare the posterior estimate of student ability with the corresponding difficulty of the question or the content of the question to determine whether the student has achieved proficiency. The assessment agent 122 may then continue to administer tasks to the student, such as the student 128.

The calibration agent 120 and assessment agent 122 may execute entirely on the computing device 102, or alternately may execute at least partly on external computing devices or systems. For example, in certain embodiments, the calibration agent 120 and assessment agent 122 execute on separate computing devices. Similarly, in certain embodiments, either the calibration agent 120 or assessment agent 122 may be omitted from the learning system 100. Alternately, components of the calibration agent 120 may be implemented either partly or wholly within the assessment agent 122, or vice versa. Components of the calibration agent 120 and assessment agent 122 may also be distributed across multiple computing devices or systems.

Figure 2:
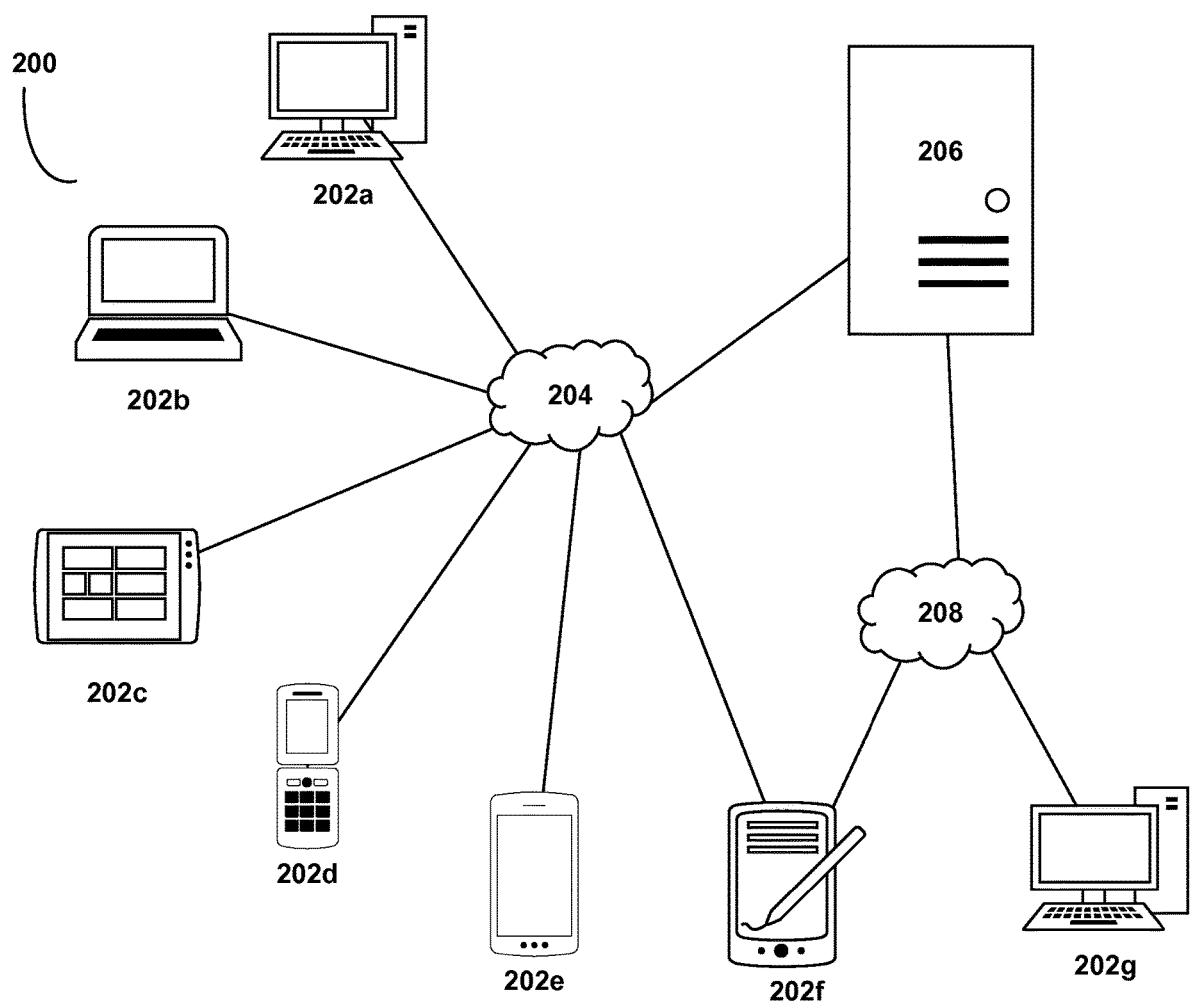

As noted above, portions of the learning system 100 may be distributed between one or more devices or components. FIG. 2 illustrates another embodiment of a learning system 200 according to the disclosure. In this embodiment, the learning system 200 comprises a plurality of client computing devices 202a-g, a network 204, and at least one server computing device 206. As shown, the client computing devices 202a-g may comprise desktop personal computers 202a, 202g, a laptop computer 202b, a slate device 202c, a mobile phone 202d, a smart phone 202e, and a tablet device 202f. Each client computing device 202a-g may communicate with other devices and computers via a network 204. The network 204 can be any network, such as the Internet, a wired network, a cellular network, and a wireless network. In certain embodiments, each client computing device 202a-g may communicate with one or more storage systems, server computing devices (e.g., the server computing device 206), cloud computing systems, or other sites, systems, or devices hosting external services to access remote data or remotely executing applications. Further, client computing devices 202a-g may utilize multiple networks to access the server computing device 206, such as a local connection 208. The local connection 208 may be, for example, a serial, USB, local area network (LAN), wireless, Bluetooth, or other form of local connection physically close in proximity to the server computing device 206.

In this embodiment, the server computing device 206 may be configured to calibrate the difficulty of a plurality of questions and to perform an assessment of a plurality of students, similar to the computing device 102 of FIG. 1. Accordingly, the server computing device 206 may comprise a calibration agent and an assessment agent, such as the calibration agent 120 and assessment agent 122 of FIG. 1. Thus, each of the client computing devices 202 may connect to the server computing device 206 over the network 204 or local connection 208 in order to undertake an examination, assessment, test, or other engage in some other form of interaction with the learning system 200. However, as noted above, various components of the learning system 200 may be implemented either partly or wholly within the client computing devices 202. For example, in certain embodiments, user privacy may be ensured by scoring an assessment locally on a client computing device 202, as opposed to on the server computing device 206. Accordingly, all or portions of the calibration agent 120 and assessment agent 122 may be executed locally on the client computing devices 202. Various configurations and embodiments are considered to be within the scope of the disclosure.

Embodiments of the disclosure, such as the learning systems 100, 200, may be used for on-line learning, or electronic learning/E-learning. Electronic learning may include the delivery of any instructional and/or training program using one or more interactive computer-based technologies. E-learning may be used where networking or distance communications are involved. For example, e-learning may include, without limitation, distance learning and/or Web-based learning. In certain embodiments, learning systems according to the disclosure may comprise MITx Courses, such as those available via edX (www.edx.org). While the learning systems 100, 200 are described above as separate embodiments, various embodiments of learning systems 100, 200 may combine or interchange components to form various learning systems according to the disclosure. Further, the embodiments according to the disclosure may execute all or only parts of the exemplary methods and functions described herein.

Framework for an Exemplary Learning and Analysis System

Figure 3:
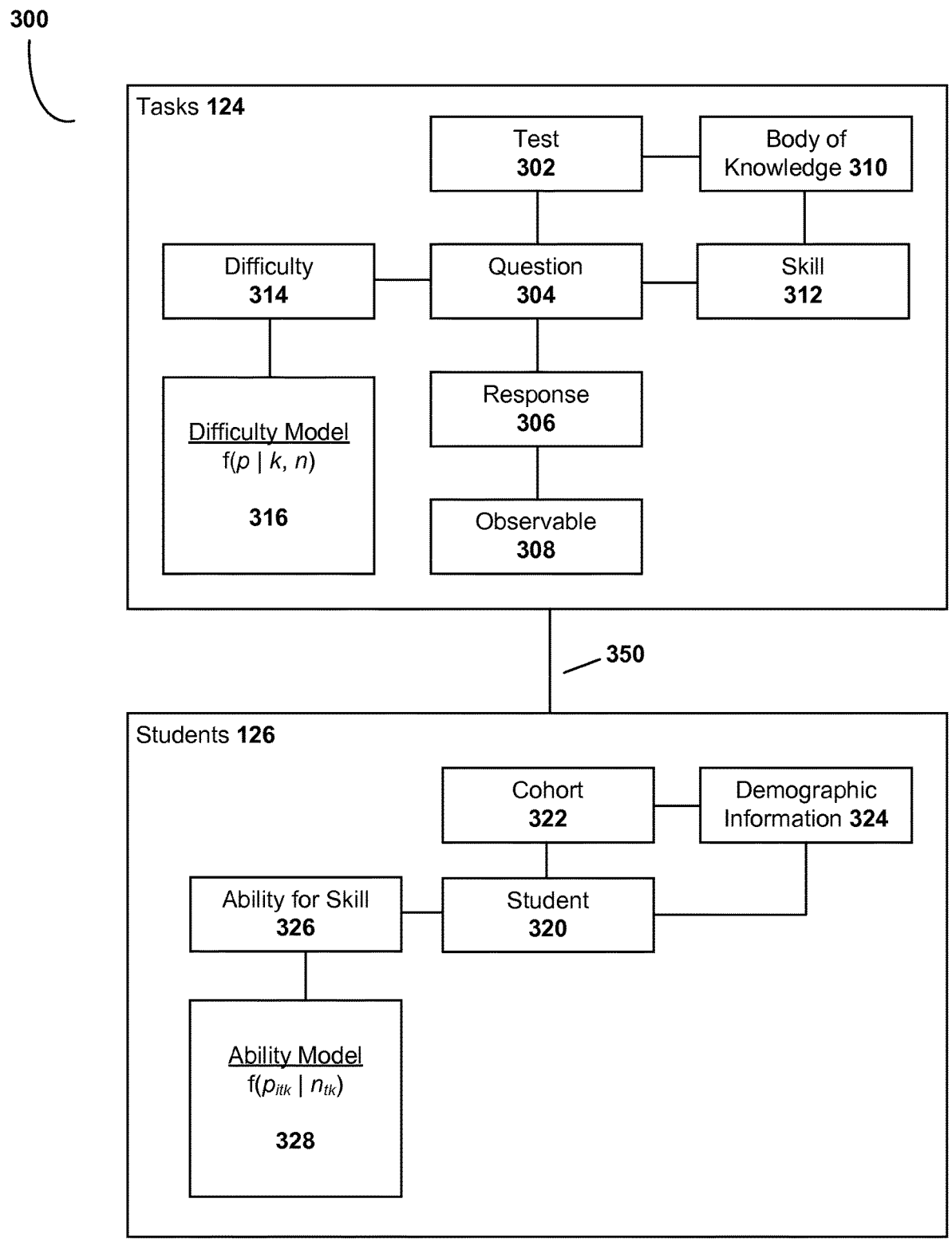

FIG. 3 is a block diagram illustrating a learning framework 300 for performing educational assessment and learning in the context of a learning system, such as the learning system 100 of FIG. 1. The learning framework 300 depicts exemplary types of information, data, and models related to the plurality of tasks 124 and students 126 in the context of a learning system.

As previously described, tasks 124 may be the most obvious component of an assessment, examination, or test 302, and may represent the interaction 350 between a student and a question during an examination. A task may comprise a question 304 that elicits a simple response 306 from a student or examinee, such as a selection of an answer to the question 304. Subsequent processing and scoring of the response 306 (i.e., as either correct or incorrect) yields a single observation, or observable 308. The observable 308 may be used for various purposes, including for estimating the difficulty of the question, estimating the ability of the student, grading student performance on the test 302, and for simply collecting information about the student.

Each test 302 may be related to a body of knowledge 310, and may comprise a plurality of questions 304 related to a plurality of skills 312. Each question 304 may be related to various content. For example, if the questions 304 are for a calculus course, the questions 304 may be related to content such as derivatives, integrals, and series. Similarly, for an LSAT review course, the questions 304 may be related to content such as analytical reasoning, logical reasoning, reading comprehension, and writing ability. For purposes of this disclosure, a skill may represent part of a body of knowledge and therefore, the content of a question may be considered to be all or part of a skill 312. Accordingly, a student who provides a correct response to a question related to integrals has provided evidence that the student may have become proficient in integrals, and thus has acquired that skill 312. In this embodiment, each question 304 is related to a particular skill 312. However, in certain embodiments, a question 304 may be related to multiple skills 312.

A body of knowledge 310 may comprise a plurality of skills 312. For example, the body of knowledge 310 could represent the educational materials taught in a course, such as calculus, physics, or computer science. Each skill 312 may represent a subset of the body of knowledge 310. Thus, for a body of knowledge 310 related to calculus (e.g., for a test 302 administered in a calculus course), a skill 312 may represent an understanding of derivatives, integrals, or series. A student's proficiency in skills 312 may then be tested by submitting tasks 124 comprising questions 304 related to each skill 312 to a student during an examination or test. In certain embodiments, a body of knowledge 310 may comprise only a single skill 312, and therefore a corresponding test 302 may comprise questions related only to a single skill 312.

Further, each question 304 may have a difficulty 314. The difficulty 314 may be a pre-determined value, or a dynamic value that is adjusted in real-time in response to new information or evidence received regarding the question 304, such as a response or a set of responses from a student or group of students. The difficulty 314 of a question may also vary depending on the current student or group of students taking the question. In this embodiment, the difficulty 314 of a question is a probabilistic measure that represents the probability that a student will provide a correct response to the question 304. This probability may be modeled by a difficulty model 316. As will be described in further detail below, in this embodiment the estimated difficulty of a question 304 is modeled using a beta-binomial model. However, other models may also be used to provide posterior distributions and estimates for difficulty 314. Further, defining the difficulty of a question probabilistically establishes a principled way to determine whether a student has acquired proficiency in a particular skill, as will be described in further detail below.

As noted above, each test 302 may comprise a plurality of questions 304. Tests 302 may be administered to students or examinees in a variety of ways, such as in a classroom or on-line learning environment. In some testing environments, each student may not receive the same set of questions 304 for a particular test 302. The scheme determining which student receives which task(s) is called the design of the test 302. The design of a test 302 may be static and pre-determined. The design of a test 302 may also be random. Alternately, the design of a test 302 may be dynamic, such that tasks and questions are selected based at least in part on the student's previous responses to questions 304 on the test 302. Further, in some embodiments, the test 302 may be interactive and used as a means to further instruct the student, such as by providing educational materials to the student between questions to engage the student in learning. The choice of educational materials may also be dynamic and based at least in part on the student's previous responses. Various embodiments and combinations of the above features are considered to be within the scope of the disclosure.

In this embodiment, the questions 304 may be multiple choice questions having several incorrect responses and a single correct response. Accordingly, the observables 308 may be Boolean variables (i.e., either "0" or "1") that represent whether a student interacting with the question 304 has provided a correct response. In certain embodiments, the question 304 may only have two potential responses, or may be a true/false question. In certain embodiments, the question 304 may be an essay question, such that the corresponding response 306 is a written essay. The observable 308 may then be the rating assigned by a grader. This rating may either be a Boolean variable, or a percentage grade. In certain embodiments, a test 302 may comprise a plurality of types of questions, i.e., a mixture of true/false, multiple choice, and essay questions. Moreover, the observable 308 may further comprise information related to previous responses by the student to previous questions.

The principal objects used to calibrate question difficulty and which undertake tests 302 are students 320. As noted above, students 320 may comprise any person, entity, or agent that interacts with the learning system 100 to engage in learning and/or testing. The students 320 or examinees for a test 302 or other form of learning session may be representative of a group or population of interest, such as a cohort 322. For purposes of the disclosure, a cohort 322 is a group of students 320 that are related together by one or more factors. For example, a cohort 322 may be a group of students 320 who work through a particular curriculum together to achieve the same academic degree or certificate. A cohort 322 may also be selected based on demographic information 324, which may be gathered from a questionnaire, survey, or other source and may include, for example, information such as gender, age, ethnicity, employment status, educational level, and location. However, a cohort 322 may be selected based on any rationale for grouping a particular set of students together. In certain embodiments, cohorts may be used by learning systems to track the performance of a plurality of students. In the context of on-line learning and education, cohorts have become popular as a way to address the lack of traditional social interaction that is common in on-site education.

Cohorts 322 may also be used to calibrate the difficulty 314 of questions 304. To understand the learning process, it is helpful to understand the underlying difficulty 314 of a question 304 or plurality of questions that comprise an examination or test 302. As noted previously, the difficulty 314 of a question may be a probabilistic measure that represents the probability that a given task administered to a particular student 320 or cohort 322 will yield a correct response. The difficulty 314 may be modeled by a difficulty model 316. In this embodiment, the difficulty model 316 is a beta-binomial model, as will be described in further detail below. However, the difficulty model 316 may comprise any kind of statistical model that can be used for updating a posterior distribution or estimate of difficulty 314 for a question 304. For example, in certain embodiments, the difficulty model 316 may comprise, without limitation, static Bayesian models, dynamic Bayesian models, likelihood models, neural network models, models using learning rules and local filter algorithms, and the like.

Figure 4:
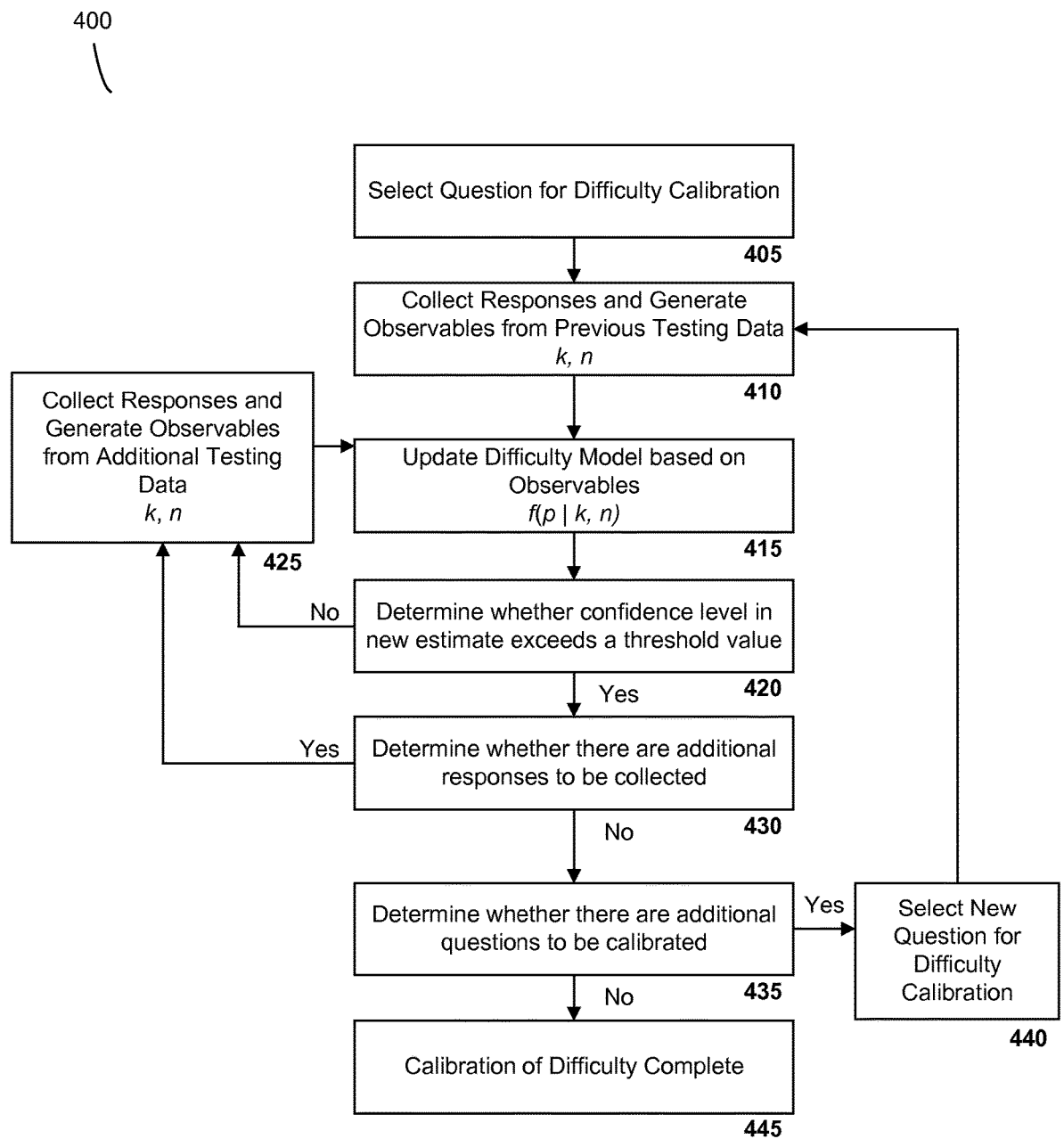

As will be described in further detail below with respect to FIG. 4, the calibration agent 120 may utilize a set of previous responses to tasks 124 to determine the difficulty 314 of a question 304 by estimating parameters of the difficulty model 316. The difficulty 314 of a question 304 may vary depending on the current student 320 or cohort 322, reflecting that different groups may have a different probability of a correct response to a question. Accordingly, in certain embodiments, multiple difficulty models 316 may be used to estimate the difficulty of a question 314 for each of a plurality of cohorts 322. These values may be stored on the computing device 102, storage device 114, or other component of the learning system 100 and accessed as needed.

Each student 320 has an ability 326 that represents the student's proficiency with respect to a particular skill 312. In this embodiment, the ability 326 is a probabilistic measure that represents the probability that a given student 320 will provide a correct response 306 to a question 304 related to particular content or testing a particular skill 312. The ability 326 may be determined using an ability model 328. As a student 320 interacts 350 with a task 124 or question 304 to produce an observable 308, the ability model 328 may be used to provide a new estimate of ability 326 for that skill 312. In this embodiment, the ability model 328 comprises a state-space model; however, the ability model may also comprise other statistical models, such as a beta-binomial model. Similar to the difficulty model 316, the ability model 328 may comprise any kind of statistical model that can be used for updating a posterior distribution or estimate of ability 326 for a skill 312. For example, in certain embodiments, the ability model 328 may comprise, without limitation, static Bayesian models, dynamic Bayesian models, likelihood models, neural network models, other models using learning rules and local filter algorithms, and the like.

The ability model 328 may comprise a plurality of inputs for information relating to the student 320, observable 308, and skill 312. As output, the ability model 328 provides an improved, or posterior, estimate of ability 326. As new questions 304 are encountered for that skill 312, the ability model 328 may be further updated to provide new posterior estimates of ability 326. Further, as each test 302 may comprise multiple skills 312, each student 320 may be associated with various estimates for ability 326 for each skill 312. As will be described in further detail below with respect to FIG. 5, a learning system, such as the learning system 100 of FIG. 1, may employ an assessment agent 122 that may utilize tasks 124 to estimate the ability 326 of a student 320 for a particular skill 312 by using the ability model 328.

The assessment agent 122 may use the ability model 328 to determine student performance in real-time after each question 304. Thus, the ability 326 of a student may be tracked and analyzed in real-time, allowing for a real-time analysis of learning. In certain embodiments, a student's performance on a test may be analyzed to provide evidence that the student 320 has learned, or acquired, a skill 312. As observables 308 are used to provide a new estimate of ability 326, the ability 326 may be compared to the estimate of difficulty 314 for the question 304. Once the estimate for ability 326 surpasses the estimate of difficulty 314 within a specified confidence level, the learning system 100 may consider the skill 312 to be acquired by the student 320. This information may be used for various purposes, such as for choosing or altering the types of questions 304 used in an examination or test 302. For example, once a student is considered to have mastered a particular skill 312, then the test 302 may omit future questions 304 related to that skill 312, and instead submit other questions 304 testing other skills 312 within the body of knowledge 310. A student 320 may be considered to have mastered a particular body of knowledge 310 once all of the skills 312 within the body of knowledge 310 have been acquired. Similarly, if the ability 326 of a student has surpassed the difficulty level of a set of questions 304, the assessment agent 122 may then select questions with a higher difficulty. In certain embodiments, this process may be continuous until the student has mastered the body of knowledge; however, in other embodiments, the test 302 may have a pre-determined time or question limit.

Determining Question Difficulty

The difficulty of a question may be determined in a variety of ways. As described above, the underlying difficulty of a question may be the probability that a student will provide a correct response. Accordingly, in one embodiment of the disclosure, the difficulty of a question is expressed as a probabilistic measure representing the probability that an examinee within a given cohort will respond correctly to that question. The difficulty may initially be set by an expert opinion, or set according to an initial distribution, such as a beta distribution. The difficulty of each question may then be calibrated and determined, e.g., by using Bayesian inference, prior to use of the question in a test. The difficulty of each question may also be calibrated and determined dynamically during a test or examination. Difficulty calibration may be performed in the context of a learning environment or learning system, such as the learning system 100 of FIG. 1.

As used in this disclosure, calibration of question difficulty refers to a process of generating a posterior estimate of the difficulty of a question in response to new evidence. FIG. 4 is a flow diagram illustrating a method 400 of calibrating, or estimating, the difficulty level of a question for use in an examination or test in accordance with an embodiment of the disclosure. The method 400 can be performed in the context of a learning system 100, or by any other system or method that utilizes testing or learning. The method 400 may be performed by a calibration agent, such as the calibration agent 120 of FIG. 1. For example, the calibration agent 120 may perform the method 400 during a pre-testing phase, provide new estimates of difficulty for a set of questions post-examination, or alternately perform the method dynamically as responses to questions are received from students in real-time.

Estimating the difficulty of a question may include a calibration agent (such as the calibration agent 120 of FIG. 1), selecting a question for difficulty calibration (step 405). Information comprising a plurality of previous responses to the question is then collected, which may then be scored by the calibration agent 120 to produce a set of observables (step 410). The observables may be used to update a difficulty model, such as the difficulty model 316 of FIG. 3, which may be used to provide a posterior estimate of the difficulty of the question (step 415). The calibration agent may then determine whether the confidence level in the posterior estimate of difficulty exceeds a desired threshold value, e.g., 0.95 (step 420). If the confidence level is less than the threshold value, the calibration agent may then attempt to collect additional testing data to attempt to improve the estimate (step 425). Regardless of the confidence level, the calibration agent 120 may continue to collect additional responses for calibration to further improve the estimate (step 430). The calibration agent 120 may repeat the method 400 for as many questions as are needed (steps 435, 440). Once the difficulty of all questions has been calibrated with previous testing data, calibration of difficulty is considered to be complete (step 445).

The process may be repeated when additional information related to a plurality of responses is obtained, for example, at a later time and date. Further, the process may be repeated separately for different cohorts, reflecting that the difficulty of a question may vary between cohorts having examinees or students with different experience levels, demographics, and abilities. Thus, each question may have a plurality of difficulty levels, each related to a particular cohort. Difficulty levels may be stored by a learning system, such as the learning system 100 of FIG. 1, for example, on a computing device 102 and/or a storage device 114. Difficulty levels may also be determined on an as-needed basis, for example, by retrieving a previous set of responses for a given cohort or selection of students and performing the method 400. In use, difficulty levels may be a probability distribution or a corresponding estimate.

While this embodiment describes a method of calibrating a plurality of questions by retrieving information comprising a plurality of responses, any manner of data collection may be used to provide observables to generate new estimates of question difficulty. For example, previous examination results from previous cohorts and students, such as testing data from previous years for a given class, may be supplied to the calibration agent 120 to use as observables. A learning system may use a pre-testing environment comprising an initial population of students to provide the necessary responses and observables to calibrate the questions. Further, difficulty levels may be improved in real-time during a test or examination. For example, an assessment agent, such as the assessment agent 122 of FIG. 1, may provide responses or observables to the calibration agent 120 to improve estimates of difficulty in real-time.

Similarly, an initial estimate of difficulty, absent observables, may be obtained from a variety of sources. For example, an initial prior distribution to begin calibration without any previous testing data could be a probability distribution having a mean centered on an arbitrarily chosen 75% chance of answering the question correctly. Similarly, an estimated prior distribution can be based on the probability that an examinee will produce a correct response based on pure chance, such as 0.5 for a true/false question, 0.25 for a 4-question multiple choice answer, or 0.20 for a 5-question multiple choice answer. Alternately, the initial difficulty may be set manually using an expert opinion.

As described above, one way to represent the difficulty of a question is to define question difficulty as the probability that members of a given cohort will provide a correct response. In contrast to previous approaches such as IRT, which model question difficulty indirectly, this definition is highly flexible and allows for various difficulties to be associated with a single question depending on a particular cohort or examinee. For example, a question provided to a graduate class may be considered to have a high probability of a correct response (and thus be considered "easy,") whereas the same question submitted to an undergraduate class would have a low probability of a correct response (and thus be considered "hard").

Information related to responses from previous students may be scored as either correct or incorrect (step 410). The number of correct responses k and the total number of student of the cohort n may then be recorded and provided to the calibration agent 120, which then updates a difficulty model, such as the difficulty model 316 of FIG. 3. For example, assuming a number of n students within the cohort, each student's response, is given a value of "1" if the student answered the question correctly. Alternately, n is given a value of "0" if the student answered the question incorrectly. The probability of a correct answer, i.e., the difficulty of a question, is p. Thus, the probability that a student within the cohort answers a question correctly can be understood in terms of the Bernoulli probability distribution:

$$Pr(n_i|p) = p^{n_i}(1-p)^{1-n_i}. \qquad (1)$$

The calibration agent may then retrieve a prior estimate of the difficulty of the question, p. As noted above, the prior probability distribution of p may be a previously calculated distribution. In one example, an initial prior probability distribution of p may be a beta distribution, defined by:

$$f(p) = \frac{\Gamma(\alpha+\beta)}{\Gamma(\alpha)\Gamma(\beta)} p^{\alpha-1}(1-p)^{\beta-1}, \qquad (2)$$

where $\alpha>0$ and $\beta>0$. In one example, $\alpha=70$ and $\beta=30$, representing a difficulty distribution having a mean probability of a correct response of 0.7. If n students in the cohort attempt to answer the question, then k is the total number of students that answered the question correctly, or $$k = \sum_{i=1}^{n} n_i.$$

Assuming that each student in the cohort answered the question independently, the number of students who answered the question correctly given the size of the cohort follows the binomial probability distribution:

$$f(k \mid n, p) = \binom{n}{k} p^k (1-p)^{n-k}. \qquad (3)$$

Next, the observed values of k and n may be used to find the posterior distribution of p, and thus may be used to provide an improved estimate for the difficulty of the question (step 415). After observing the observables, Bayes' theorem may be used to update the state of knowledge about the unknown difficulty model variable, p. From the conjugate relationship between Equations (2) and (3), the posterior distribution of p is:

$$\begin{aligned} f(p \mid k, n) &= \frac{f(p)f(k \mid n, p)}{f(n)} \qquad (4)\\ &= \frac{\frac{\Gamma(\alpha+\beta)}{\Gamma(\alpha)\Gamma(\beta)} p^{\alpha-1}(1-p)^{\beta-1} \binom{n}{k} p^{k-1}(1-p)^{n-k}}{f(n)}\\ &= \frac{\Gamma(n+\alpha+\beta)}{\Gamma(k+\alpha)\Gamma(n-k+\beta)} p^{k+\alpha-1}(1-p)^{n-k+\beta-1}, \end{aligned}$$

wherein the equation $f(n)=\int_0^1 f(p)f(n|p)dp$ is the normalizing constant to make the total probability for all potential values of p equal to 1. The properties of the posterior distribution of p may be used to determine the difficulty of the question. The expected value of the posterior distribution may provide an estimate of difficulty for the question, and the variance of the posterior distribution may provide a certainty for that estimate. The mode of the posterior distribution or an appropriate quantile, such as the median, or $30^{th}$ percentile, may also be used in determining the estimate for difficulty.

Accordingly, by finding the posterior probability distribution of p, a new estimate of the difficulty of a question may be generated. This approach significantly differs from that taken previously by other approaches, such as IRT, because the level of difficulty of questions is tracked and defined in terms of an explicit probability, as opposed to a fixed or random effect in either a static or dynamic statistical model. As will be described in further detail below, defining question difficulty probabilistically may be further leveraged to evaluate student ability, skill acquisition, and learning. Other approaches for computing the estimate of question difficulty can also be used. These include but are not limited to likelihood methods, state-space methods and machine learning methods.

The posterior distribution of p may be stored and retrieved later for use in either testing or as a prior distribution for encountering new data. The calibration process may produce posterior distributions for all of the difficulty model parameters. These parameters may be exported as calibrated difficulty models and may be saved for use as refined models for subsequent iterations of the calibration process. The process may be repeated for additional members of a cohort (e.g., using data provided at a later date), for additional questions testing the same skill, or for additional questions testing other skills, either within or separate from the current body of knowledge. In this way, a single question may comprise a plurality of posterior estimates of difficulty levels related to particular students or cohorts.

Dynamic estimates of difficulty may also be used to determine the performance and quality of a course curriculum, teaching materials, and even the instructors used or employed to instruct students in the skills or body of knowledge tested by a test. For example, if the difficulty of a particular question significantly increases for a given cohort across class years, it may be the result of the students not having sufficiently learned the material or content tested by the question. Accordingly, an instructor or administrator may then evaluate the teaching materials to determine whether that material was omitted, or not given sufficient exposure. Similarly, dynamic estimates of difficulty may be used to evaluate instructors or administrators. Students within the same cohort taking a class, but having different instructors, who create significantly different estimates of difficulty for given questions may indicate that the instructor for that class was not particularly effective.

Test Design

The above-described concept of defining the level of difficulty of a question can be used to construct tests that precisely assess performance, skill acquisition, or concept mastery. As described above, given that a correct response to a question can be characterized in terms of its posterior probability, it follows that the level of difficulty of a question can be defined by the probability of a correct response. Accordingly, a generalized concept of question difficulty may be defined as an "easy" question having a high probability of a correct response from the cohort (e.g., 0.9), a "hard" question having a low probability of a correct response (e.g., 0.5), and an "intermediate" question having a probability of a correct response somewhere between (e.g., 0.7). Thus, the design of tests (such as the 302 of FIG. 3) for a particular body of knowledge may be configured to include a certain number of easy, intermediate, and hard questions. To consider that the body of knowledge has been "mastered," an examinee may be required to provide correct responses to a certain number of the easy, intermediate, and hard questions.

Alternately, a set of questions may be randomly selected such that the questions have a desired sampling of difficulty levels. This is advantageous in that each generated test may have a different set of questions, yet may be considered to be equally difficult to another test. This feature also has applications in paper testing environments or other environments wherein multiple students are seated within the same room, such that students sitting close to one another will be unable to gain an unfair advantage by looking at another student's answers. However, in certain embodiments, the selection of questions for a test may be pre-determined or selected manually according to their difficulty.

Real-Time Assessment of Student Ability and Learning

Figure 5:
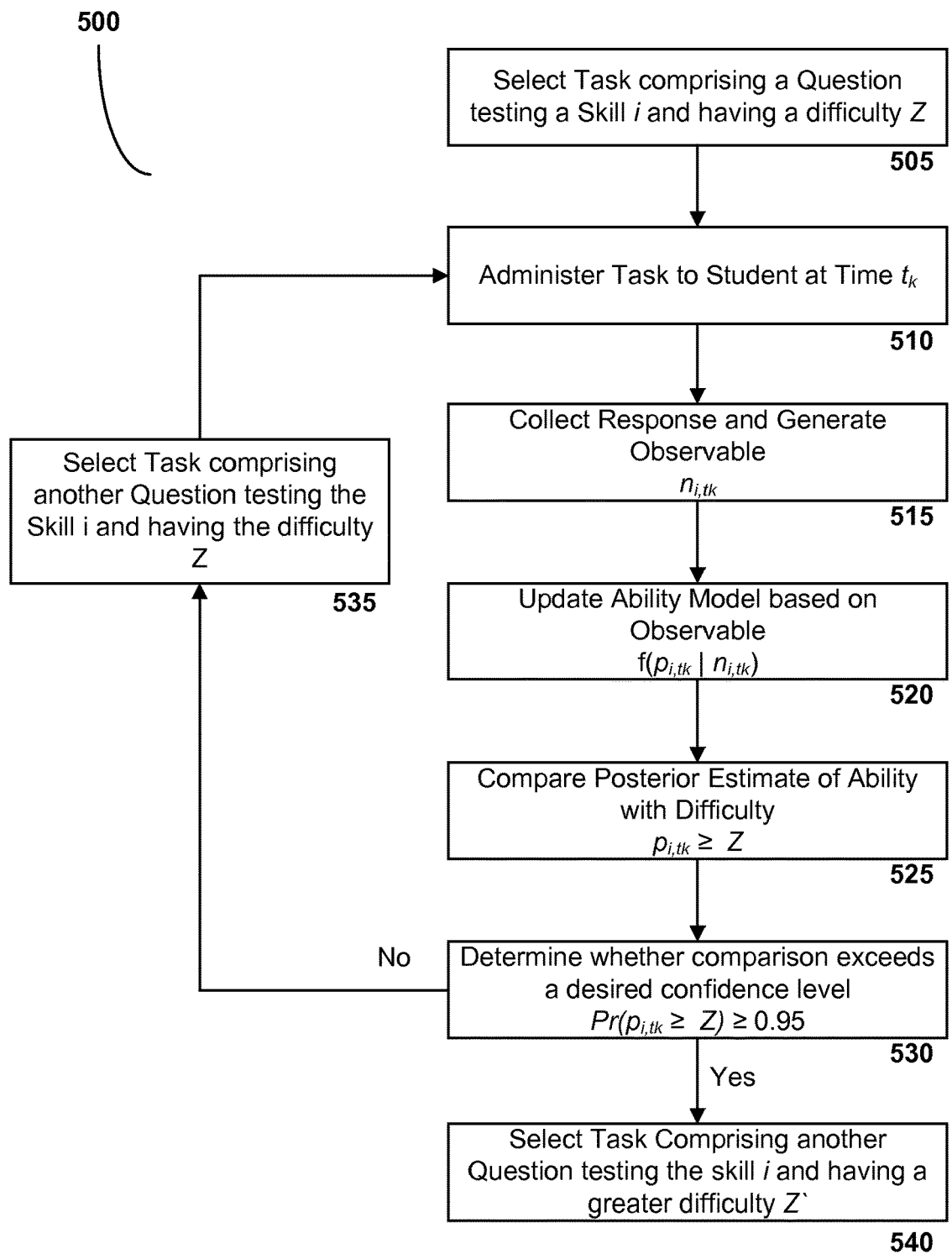

Student ability and learning may be tracked and assessed during a test using an ability model, such as the ability model 328 of FIG. 3. FIG. 5 is a flow diagram illustrating a method 500 of estimating the ability of a student with respect to a particular skill after the student has provided a response to a question testing the skill, and adjusting the submitted questions to have varying difficulty in response. The method 500 may be used in the context of a learning system, such as the learning system 100 of FIG. 1, or alternately used by any other system or method that performs an analysis of learning or student ability. An assessment agent, such as the assessment agent 122 of FIG. 1, may perform all or only some of the steps of the method 500 in order to administer tasks to students, generate observables, create posterior estimates of student ability, and determine whether the student's ability has surpassed the difficulty of a question.

For this embodiment, it is assumed that in an interval of time ($t_0$,T] the assessment agent 122 may administer an examination at K time points in the interval denoted as ($t_0 < t_1 < t_2 << t_k < \ldots < t_K \leq T$]. The method 500 is performed in the context of a series of the K individual time points [$t_1, \ldots, t_k, \ldots, t_K$], wherein at each time point $t_k$ a task is administered to a student for completion. It should be noted that time point $t_0$ is a time point prior to starting the test, and thus the first task is encountered at time point $t_1$. The time point $t_0$ may be used to set initial values for the parameters of the ability model, such as the cognitive state of the student prior to taking the test, as will be discussed in further detail below.

At a given time point $t_k$, the assessment agent 122 selects a task comprising a question that tests a particular skill (step 505). The question is selected from a set of questions having a known or established difficulty level, Z, with a known probability model. The assessment agent 122 may then administer the task to a student (step 510), who in turn interacts with the task by providing a response to the question. The response is then collected and scored by the assessment agent 122 to produce an observable, $n_{i,k_k}$, thus providing new information and evidence regarding the student's proficiency with regards to skill i at time point $t_k$ (step 515). The observable is used to update an ability model, such as the ability model 328 of FIG. 3, to provide a posterior estimate of the ability of the student with respect to the skill i tested by the question (step 520). The posterior estimate of ability is then compared with a threshold value, such as the difficulty level Z of the question (step 525). If the posterior estimate exceeds the difficulty level Z of the question with a sufficient confidence level, e.g., 0.95 (step 530), then the assessment agent 122 may determine that the student has mastered questions for skill i having that level of difficulty Z. Accordingly, for the next question at time point $t_{k+1}$, the assessment agent 122 may then select another task comprising a question testing the skill i, but having a greater difficulty level Z' (step 540). However, if the posterior estimate does not exceed the difficulty level of the question with sufficient confidence, then the assessment agent 122 may select another task comprising another question testing the skill i and having the same difficulty Z (step 535). The method 500 may repeat until the student has reached the conclusion of the test, has provided a pre-determined number of correct or incorrect answers, or has reached some other appropriate end point. Accordingly, the method 500 may be used to administer tests having an appropriate level of difficulty tailored to the current estimate of ability for the student.

Further, the assessment agent 122 may also decide to submit questions having an easier difficulty. For example, if the estimate of student ability is significantly less than the current difficulty, or the student has provided a certain number of incorrect responses, the assessment agent 122 may decide to submit tasks comprising questions having an easier difficulty. In this way, the assessment agent 122 can tailor the difficulty of questions on a test for the particular student being tested.

Moreover, after generating a posterior estimate of student ability for the skill i, the assessment agent 122 may also choose to select a task testing a different skill, j. For example, if the assessment agent 122 determines that the student has mastered questions testing skill i with a given difficulty, the assessment agent may then choose to submit questions testing a different skill j until the student has achieved a similar level of proficiency. As will be described in detail below with respect to FIG. 6, the assessment agent 122 may also determine whether a student has acquired or mastered the skill tested by the question, which may result in the assessment agent no longer administering questions testing that skill.

Selecting an initial task comprising a question testing a particular skill (step 505) may be performed in a variety of ways. For example, the assessment agent 122 may select the question from the design of a current test being administered to the student. The test may comprise questions related to a particular body of knowledge, or only include questions related to a few skills. Questions may be multiple choice, essay, or any other kind of question having a response that may be evaluated as a numerical value. Questions may be selected having a difficulty distribution that is appropriate for the current estimate of the student's ability or for a given course. Questions may also be manually selected, e.g., by an administrator, based on a set of desired skills or body of knowledge, or other factors.

Tasks, and therefore questions, may be submitted to the student in any manner (step 510). While in this embodiment, questions are submitted to students via a learning system 100, questions may also be submitted to students by paper and pencil, machine-readable paper forms, or other formats. Similarly, a student's response to a question may be collected and scored in a corresponding manner (step 515). Students undertaking an assessment via a computing device, such as the computing device 102 of FIG. 1, may submit a response by interacting with the computing device 102, such as via a mouse-click, tap, keyboard, or voice entry. The assessment agent 122 executing on the computing device may score the response to generate an observable. Alternately, the assessment agent 122 may score the response on a server off-site. In certain embodiments wherein a question is an essay, the response may require a grader to review the essay and provide a rating, which may then be supplied to the assessment agent 122 for use. Further, as previously noted, the observable may be concurrently provided to a calibration agent, such as the calibration agent 120 of FIG. 1, to generate a posterior estimate of the difficulty of the question.

Once the observable is created, an estimate of ability is calculated using an ability model for the student, such as the ability model 328 of FIG. 3 (step 520). In this embodiment, the ability model 328 is a state-space model that can be used for either a real-time or a retrospective analysis of learning and student ability. As noted previously, the test may comprise a plurality of questions that test a plurality of skills. During the test, at a time point $t_k$, the student encounters a question that tests a particular skill i from a set of d skills. That is, i=1, . . . , d. In this embodiment, each question may be answered either correctly or incorrectly. Thus, the student's scored response, or observable, at time point $t_k$ to the question about skill i at time $t_k$ is $n_{i,t_k}$, scored as "1" if the question is answered correctly, and $n_{i,t_k}$ is scored as "0" if answered incorrectly (step 515). The ability model 328 may comprise an observation model at time point $t_k$, which may be defined by:

$$p(n_{i,t_k} \mid x_{i,t_k}) = \prod_{i=1}^{d} p_{i,t_k}^{I_{i,t_k} n_{i,t_k}} (1 - p_{i,t_k})^{I_{i,t_k}(1-n_{i,t_k})}, \quad (5)$$

In this embodiment, each question tests only a single skill i, and thus, at each time point $t_k$, only a single skill i is being tested. Accordingly, $I_{i,t_k}$ is an indicator function that returns a value of "1" if at time $t_k$ skill i is being tested, and a value of "0" otherwise. Let $x_{i,t_k}$ represent the student's cognitive state at time point $t_k$. Thus, at time point $t_k$, the probability $p_{i,t_k}$ of responding correctly to a question testing the skill i may be defined by:

$$p_{i,t_k} = [1 + \exp(x_{i,t_k})]^{-1} \exp(x_{i,t_k}), \quad (6)$$

where $x_{i,t_k}$ is the subject's cognitive state with respect to the skill i at time $t_k$. Accordingly, the probability of responding correctly to a question testing the skill i is a function of the subject's cognitive state, $x_{i,t_k}$, at time $t_k$. In this embodiment, the cognitive state of the student is a parameter that defines the student's capabilities for answering questions on a test regarding a body of knowledge that comprises a set of skills. For example, the cognitive state may represent, without limitation, the student's understanding of the body of knowledge; the skills comprising that body of knowledge; and the student's test-taking ability. The cognitive state may be represented as a vector in which at time $t_k$ as $x_{t_k} = [x_{1,t_k}, \ldots, x_{d,t_k}]'$, where the student is envisioned to have a cognitive state for each of the d skills comprising the body of knowledge being examined in the test. Equation (6) illustrates that the larger the value of the component $x_{i,t_k}$ of the cognitive state, the greater the probability of responding correctly to the questions related to skill i, for i=1, . . . , d. Each component of the cognitive state vector is indexed by time point to indicate that the cognitive state may increase or decrease with time, which means respectively that the subject's understanding of skill i, defined as the probability of correctly responding to a question regarding the skill, may increase or decrease over time. The temporal evolution of the subject's cognitive state may be defined by the state model:

$$x_{t_k} = [I - D(\Delta_k)A]x_{t_{k-1}} + v_{t_k}, \quad (7)$$

where $$x_{t_k} = \begin{bmatrix} x_{1,t_k} \\ \vdots \\ x_{d,t_k} \end{bmatrix} \quad A = \begin{bmatrix} a_{1,1} & \cdots & a_{1,d} \\ & \cdots & \\ a_{d,1} & \cdots & a_{d,d} \end{bmatrix}, \quad (8)$$

A is a state matrix that defines the relationship between the cognitive states, $D(\Delta_k)$ is a d-dimensional diagonal matrix with diagonal elements, $\Delta_k = t_k - t_{k-1}$ and the $v_{t_k}$ are d-dimensional independent Gaussian random variables having a mean 0 and a covariance matrix $D(\sigma^2 \therefore_k)$. Equations (7) and (8) define the Gaussian cognitive state transition probability density which we denote as $p(x_{t_k} \mid x_{t_{k-1}})$. This Gaussian probability density has mean $x_{t_{k-1}}$ and covariance matrix $D(\sigma^2 \Delta_k)$. The model in Equation (7) is a discretized version of the continuous time stochastic differential equation:

$$dx_i = Ax_i + \sigma dW(t), \quad (9)$$

wherein W(t) is a d-dimensional Wiener process. This multivariate formulation of student ability and learning allows for the analysis of multiple skills at the same time. In addition, the continuous formulation of time as a plurality of K time points $[t_1, \ldots, t_k, \ldots, t_K]$ allows for analyses in which there is an uneven temporal spacing between tests or questions.

In certain embodiments, students may be provided with the ability to view or analyze their cognitive states. This feature may be useful for a student to determine whether he or she is adequately prepared prior to taking an examination. For example, a student may use current estimates of cognitive states to predict the student's ultimate performance on an examination. Alternately, the students may desire to assess the current status of their cognitive states for a set of skills comprising a given body of knowledge prior to taking a preparatory program to improve their understanding of the body of knowledge. However, in certain embodiments, the cognitive state may remain unchanged throughout a test or examination. For example, in a final examination where the student has adequately prepared, the cognitive state should not vary throughout the examination, and may even be omitted from the ability model.

To track student ability and learning in real-time, a dynamic state estimation algorithm may be used to evaluate the model of Equations (5)-(8) at each time point $t_k$. In this embodiment, the ability model 328 uses the Chapman-Kolmogorov-Bayes' Rule system of equations. For the ability model 328, the equations are:

$$p(x_{t_k} \mid n_{t_{k-1}}) = \int p(x_{t_k} \mid x_{t_{k-1}}) p(x_{t_{k-1}} \mid n_{t_{k-1}}) dx_{t_{k-1}} \quad (10)$$

$$p(x_{t_k} \mid n_{t_k}) = \frac{p(x_{t_k} \mid n_{t_{k-1}}) p(n_{i,t_k} \mid x_{t_k})}{p(n_{i,t_k} \mid n_{t_{k-1}})}, \quad (11)$$

wherein $n_{t_k} = (I_{i,t_1} n_{i,t_1}, \ldots, I_{i,t_k} n_{i,t_k})$ is the vector of the outcomes of the test from time $t_1$ through $t_k$, $p(n_{i,t_k} \mid x_{t_k})$ is defined by Equations (5) and (6), a cognitive state transition probability density $(x_{t_k} \mid x_{t_{k-1}})$ is defined by the state-space model in Equations (7) and (8), and $p(n_{i,t_k} \mid n_{t_{k-1}})$ is the normalizing constant.

In this embodiment, how the assessment agent 122 may update the ability model based on the observable (step 520) proceeds as follows. After a student responds to a question at time point $t_{k-1}$, the probability density $p(x_{t_{k-1}} \mid n_{t_{k-1}})$ defines the probability density of the cognitive states given the observables of all of the tasks from time $t_0$ through $t_{k-1}$. Together with Equation (5), $p(x_{t_{k-1}} \mid n_{t_{k-1}})$ can be used to define the probability of responding correctly to questions related to the skill i being tested in the examination after responding to a question regarding the skill i at time $t_{k-1}$. Based on the test being administered, the cognitive state transition probability density $p(x_{t_k} \mid x_{t_{k-1}})$ defined by the state-space model in Equations (7) and (8) describes how the cognitive state at time $t_k$ is related to the cognitive state at time $t_{k-1}$. For example, the cognitive state at time $t_k$ could be predicted to be improved, remain the same, or worsen.

Equation (10) makes an explicit prediction of the cognitive state at time $t_k$ having observed the performance on the examination up through time $t_{k-1}$, and using the assumed relationship between the cognitive states at times $t_{k-1}$ and $t_k$ given by Equations (7) and (8). In other words, the probability density $p(x_{t_k}|n_{t_{k-1}})$ in Equation (10) summarizes all of the information about the student's ability to respond correctly to each skill of the d skills being tested, up through time $t_{k-1}$, and using the model for the relationship between the cognitive states at times $t_{k-1}$ and $t_k$, predicts the cognitive state at time $t_k$. For this reason, we term this probability density the one-step prediction density as it makes a prediction for the cognitive state one time point ahead of the time at which an observation (i.e., a scored response to a question) was last recorded. Because $t_{k-1}$ and $t_k$ may be arbitrary, the length of time ahead can also be arbitrary; however, as the length of time between time points $t_{k-1}$ and $t_k$ increases, the uncertainty in the prediction also increases because, by Equation (8), the variance of $v_{t_k}$ defined as $D(\sigma_v^2 \Delta_k)$ increases ask $\Delta_k = t_k - t_{k-1}$, At time $t_k$, the observation $I_{i,t_k} n_{i,t_k}$ is recorded. Its probability mass function, $p(n_{i,t_k}|x_{t_k})$, is defined by Equations (5) and (6). Therefore, by using $p(x_{t_k}|n_{t_{k-1}})$ as a prior distribution, and combining it with the observation model in Equations (5) and (6), Equation (11) uses Bayes' Rule to compute $p(x_{t_k}|n_{t_k})$, the probability density of the cognitive states at time $t_k$, given the examination outcomes up through time $t_k$. Because Equations (10) and (11) produce $p(x_{t_k}|n_{t_k})$ from $p(x_{t_{k-1}}|n_{t_{k-1}})$, they define a recursive computation, which can be used to obtain filter equations for the cognitive state.

To use this recursive formulation to analyze learning, we define a filter algorithm which uses Gaussian approximations to compute $p(x_{t_k}|n_{t_{k-1}})$ and $p(x_{t_k}|n_{t_k})$. That is, for this embodiment, Equations (10) and (11) may be computed recursively by using Gaussian approximations, to obtain filter equations for the cognitive state at time point $t_k$:

$$x_{t_k|t_{k-1}} = F_{t_k} x_{t_{k-1}|t_{k-1}} \quad (12)$$

$$\Sigma_{t_k|t_{k-1}} = F_{t_k} \rho_{t_{k-1}|t_{k-1}} F_{t_k}' + D(\sigma_v^2 \Delta_k) \quad (13)$$

$$x_{t_k|t_k} = x_{t_k|t_{k-1}} D(I_{i,t_k}(n_{i,t_k} - p_{i,t_k|t_k})) \quad (14)$$

$$\Sigma_{t_k|t_k} = [(\Sigma_{t_k|t_{k-1}})^{-1} + D(I_{i,t_k} p_{i,t_k|t_k}(1 - p_{i,t_k|t_k}))]^{-1}, \quad (15)$$

wherein $F_{t_k} = I - D(\Delta_k) A$ (from Equation (7)). The estimated probability of a correct answer at time $t_k$ for skill i given all of the examination outcomes up through time $t_k$ is $$p_{i,t_k|t_k}[1 + \exp(x_{i,t_k|t_k})]^{-1} \exp(x_{i,t_k|t_k}), \quad (16)$$

for i=1, . . . , d and the notation, $x_{t_k, n|t_{k-1}}$, is to indicate that the random variable being considered is defined at time $t_k$ given the examination outcome up through time $t_{k-1}$. Equations (12) and (13) are respectively the mean and covariance of the Gaussian approximation to the Chapman-Kolmogorov or the one-step prediction equation of Equation (10), whereas Equations (14) and (15) are respectively the mean and covariance of the Gaussian approximation to the posterior density of Equation (11).

Any Gaussian distribution is completely defined by its mean and covariance matrix. Therefore, to derive Equations (12) and (13) it suffices to show that the Gaussian approximation to Equation (10) is the Gaussian distribution with mean given by Equation (12) and covariance matrix given by Equation (13). Assume that at time point $t_{k-1}$, $p(x_{t_{k-1}}|n_{t_{k-1}})$ is defined by the Gaussian probability density whose mean is $x_{t_{k-1}|t_{k-1}}$ and whose covariance matrix is $\Sigma_{t_{k-1}|t_{k-1}}$. By Equations (7) and (8), $p(x_{t_k}|x_{t_{k-1}})$ is the Gaussian probability density with mean $x_{t_{k-1}}$ and $D(\sigma^2 \Delta_k)$ covariance matrix mean. By Equation (8), $x_{t_{k-1}} = F_{t_k} x_{t_{k-1}} + v_{t_k}$. Hence, because after observing $n_{t_{k-1}}$, $x_{t_{k-1}}$ is the Gaussian random variable with mean $x_{t_{k-1}|t_{k-1}}$ and covariance matrix $\Sigma_{t_{k-1}|t_{k-1}}$, it follows that the mean of $x_{t_k}$ given $n_{t_{k-1}}$ is $$\begin{aligned} E(x_{t_k} | n_{t_{k-1}}) &= E(F_{t_k} x_{t_{k-1}} + v_{t_k} | n_{t_{k-1}}) \\ &= F_{t_k} E(x_{t_{k-1}} | n_{t_{k-1}}) + E(v_{t_k}) | n_{t_{k-1}}) \\ &= F_{t_k} x_{t_{k-1}|t_{k-1}} + E(v_{t_k}) \\ &= F_{t_k} x_{t_{k-1}|t_{k-1}} + 0 \\ &= F_{t_k} x_{t_{k-1}|t_{k-1}}, \end{aligned} \quad (17)$$

And that the covariance of $x_{t_k}$ given $n_{t_{k-1}}$ is $$\begin{aligned} \mathrm{Var}(x_{t_k} | n_{t_{k-1}}) &= \mathrm{Var}(F_{t_k} x_{t_{k-1}} + v_{t_k} | n_{t_{k-1}}) \\ &= F_{t_k} \mathrm{Var}(x_{t_{k-1}} | n_{t_{k-1}}) F_{t_k}' + \mathrm{Var}(v_{t_k}) | n_{t_{k-1}}) \\ &= F_{t_k} \sum_{t_{k-1}|t_{k-1}} F_{t_k}' + \mathrm{Var}(v_{t_k}) \\ &= F_{t_k} \sum_{t_{k-1}|t_{k-1}} F_{t_k}' + D(\sigma_v^2). \end{aligned} \quad (18)$$

Therefore, $p(x_{t_{k-1}}|n_{t_{k-1}})$ is approximated as the Gaussian distribution with mean $F_{t_k} x_{t_{k-1}|t_{k-1}}$ in Equation (12) and covariance matrix $F_{t_k} \Sigma_{t_{k-1}|t_{k-1}} F_{t_k}' + D(\sigma_v^2)$ in Equations (13).

To show that Equations (14) and (15) provide the mean and covariance matrix respectively for the Gaussian approximation to Equation (11), it suffices first to substitute the probability density for the Gaussian approximation for $p(x_{t_k}|n_{t_{k-1}})$ and the probability mass function for the observation model $p(n_{i,t_k}|x_{t_k})$ from Equations (5) and (6) into the right hand side of Equation (11). Following these substitutions, the posterior mode (mean) defined by Equation (14) is computed by taking the logarithm of $p(n_{i,t_k}|x_{t_k})$, differentiating it with respect to $x_{t_k}$, setting the derivative equal to 0, and solving for $x_{t_k|t_k}$. The posterior variance defined by Equation (15) is derived by differentiating the logarithm of $p(n_{i,t_k}|x_{t_k})$ twice with respect to $x_{t_k}$ to obtain a Hessian matrix, and then taking the negative inverse of the Hessian matrix.

Equations (14) and (15) are non-linear in $x_{t_k|t_k}$ and may be solved efficiently, for example, by Newton's method or a linear approximation. The initial condition of the cognitive state, $x_0 = [x_{1,t_0}, \ldots, x_{d,t_0}]'$ is set along with A and $\sigma_v^2$, prior to administering the examination based on what the purpose of the examination is. Evaluating Equation (6) at time $t_0$ for each skill i, for i=1, . . . , d, defines the initial probability of responding correctly to questions related to the each skill being tested in the examination prior to taking the examination. The parameters A and $\sigma_v^2$ can be estimated using an expectation-maximization (EM) algorithm, a local mean-squared error (MSE) prediction algorithm, a local likelihood prediction algorithm, or the like.

For purposes of this disclosure, the algorithms defined by Equations (12)-(16) are referred to as a binary filter algorithm. In this embodiment, the binary filter algorithm serves as a core computational component of an assessment agent executing within a learning system according to the disclosure. Thus, the learning system 100 may be used for a real-time analysis of learning, such that the estimated probability of a correct answer, i.e. a student's ability, may be computed after each time point $t_k$. As input, the binary filter algorithm receives a vector of binary values representing responses to a plurality of questions testing a particular skill. The algorithm then calculates an estimate of the probability of a correct response for that skill.

Once the student's response to the question at $t_k$ is received (step 515), the marginal posterior distribution of $p_{i,t_k}$ may be calculated to provide an estimate of the student's ability for skill i for i=1, . . . ,d. In this embodiment, the student has provided responses to the n questions that test a plurality of skills i, create a set of observables may be represented as a vector $n_{t_k}$, which represents a total of questions k across i skills up through time $t_k$. Thus, at each time point $t_k$, the marginal posterior distribution of $p_{i,t_k}$ is (step 520):

$$f(p_{i,t_k}|n_{t_k}) = [2\pi\sigma^2_{i,t_k|t_k} p_{i,t_k|t_k}(1-p_{i,t_k|t_k})]^{1/2} \exp\{-(2\sigma^2_{i,t_k|t_k})^{-1}[\log(\hat{p}_{i,t_k}(1-\hat{p}_{i,t_k})^{-1}) - x_{i,t_k|t_k}]^2\}. \quad (19)$$

Equation (19) follows by a change of variables because each $p_{i,t_k}$ is a monotonic transformation of $x_{i,t_k}$, which is a Gaussian random variable whose mean is given by the $i^{th}$ element of Equation (14), and whose variance is given by the diagonal element of Equation (15). The approximate mode of $f(p_{i,t_k}|n_{t_k})$ is given by Equation (16).

Once the marginal posterior distribution of the student's ability has been calculated, the assessment agent 122 may compare the estimate of $p_{i,t_k}$ with the difficulty level of the question Z (step 525 of FIG. 5). If the comparison exceeds a desired confidence level, such as 0.95, the assessment agent 122 may determine that the student has mastered questions having that difficulty level (step 530). In other words, the assessment agent may determine that the student's ability has exceeded the current difficulty level of the question. The assessment agent 122 may perform this comparison by a number of methods, including but not limited to: 1) computing $Pr(p_{i,t_k}>Z)$ by convolution of the two probability densities; 2) computing $Pr(p_{i,t_k}>Z)$ using $f(p_{i,t_k}|n_{t_k})$ and Z; and 3) by assessing whether $\hat{p}_{i,t_k|t_k}>Z$. Finally, the assessment agent may administer additional tasks to the student depending on whether the student's ability has exceeded the current difficulty level, and either increase, maintain, or even decrease the level of difficulty (e.g., steps 535, 540).

The probability distribution of $p_{i,t_k}$ may be used for various operations of the learning system 100 for tracking and analyzing learning. As noted above, this value is determined at the level of single questions or items on a test, as opposed to groups of questions. Thus, this value may be used to analyze the evolution of learning over a series of individual questions or at individual time points, for example. After each question or time point, this value may be compared with the difficulty distribution of a question (e.g., step 525 of FIG. 5) to determine whether a student's ability has exceeded the difficulty of a question. Further, this value may be used to determine whether a student has acquired or mastered a skill, as will be described in further detail below with respect to FIG. 6. This value may also be used to quantify student learning and ability on a continuous scale, as opposed to a simple classification by making a hard decision as to whether the student has mastered or not mastered the material.

Use of the binary filter algorithm to track learning represents a significant advantage over previous approaches. Some previous approaches, including IRT, have used computationally intensive Markov Chain Monte Carlo (MCMC) algorithms to evaluate student learning. However, these approaches are typically impractical for all but experimental use due to the high computational requirements of the MCMC algorithms. In contrast, the present disclosure features algorithms that are computationally efficient and simple to implement for real-time learning analyses. As binary observations may be modelled through the Bernoulli likelihood (Equation (5)), the algorithm processes binary events directly for either real-time (Equations (12)-(16)) or retrospective analyses (Equations (20)-(23), below). The binary filter algorithm has a minimal number of parameters to consider, and may be evaluated using EM, local mean squared error prediction, and likelihood prediction algorithms which significantly decreases computational complexity. Thus, the binary filter algorithm allows for efficient processing and implementation with various software and hardware. For example, the binary filter algorithm may be implemented either partly or entirely on a client computing device as opposed to a server computing device, such as the client computing devices 202 and server computing device 206 of FIG. 2. Further, the binary filter algorithm may be distributed between various computing devices.

Further, the algorithm considers only the data observed up through a specified time point to assess learning, providing a true real-time analysis of learning. Rather than observing all of the data in an experiment to determine how learning has evolved during a course or examination, the present disclosure uniquely considers only the data observed up through a specified time point to assess learning, providing a true real-time analysis of learning and student ability at a specified time point. Moreover, this approach significantly differs from that taken previously by other approaches, such as IRT, because the ability of a student is tracked and defined in terms of an explicit probability at each time point. Thus, one may determine the ability of a student at each time point, as opposed to evaluating the student after completion of a test.

While in this embodiment, the ability model 328 is a state-space model, the ability model 328 may comprise other statistical models. For example, in certain embodiments, the ability model 328 may be a beta-binomial model (e.g., Equations (1) to (4)). In these embodiments, the ability of a student, i.e. the probability that a student will provide a correct response to a question, may be determined in a manner similar to what is used to determine the difficulty of a question as described above. For example, a posterior distribution for ability f(k|n, p) may be modelled using a beta-binomial model by identifying the number of correct responses k a student provides to a plurality of questions n. Depending on the environment or purpose of the test, the beta-binomial model may be preferred. For example, if a student has prepared for a test, the student's knowledge level should be static, and therefore there is no need to model or analyze the changes in the student's cognitive state. Thus, the beta-binomial model may be used to simply determine whether a student has acquired a skill or mastered questions having a particular difficulty at each time point. However, in embodiments where an analysis of student learning is desired, the state-space model may be preferred as it models the subject's cognitive state. Other ability models may include but are not limited to local likelihood models and machine learning models.

Student Learning, Skill Acquisition, and Mastery

Figure 6:
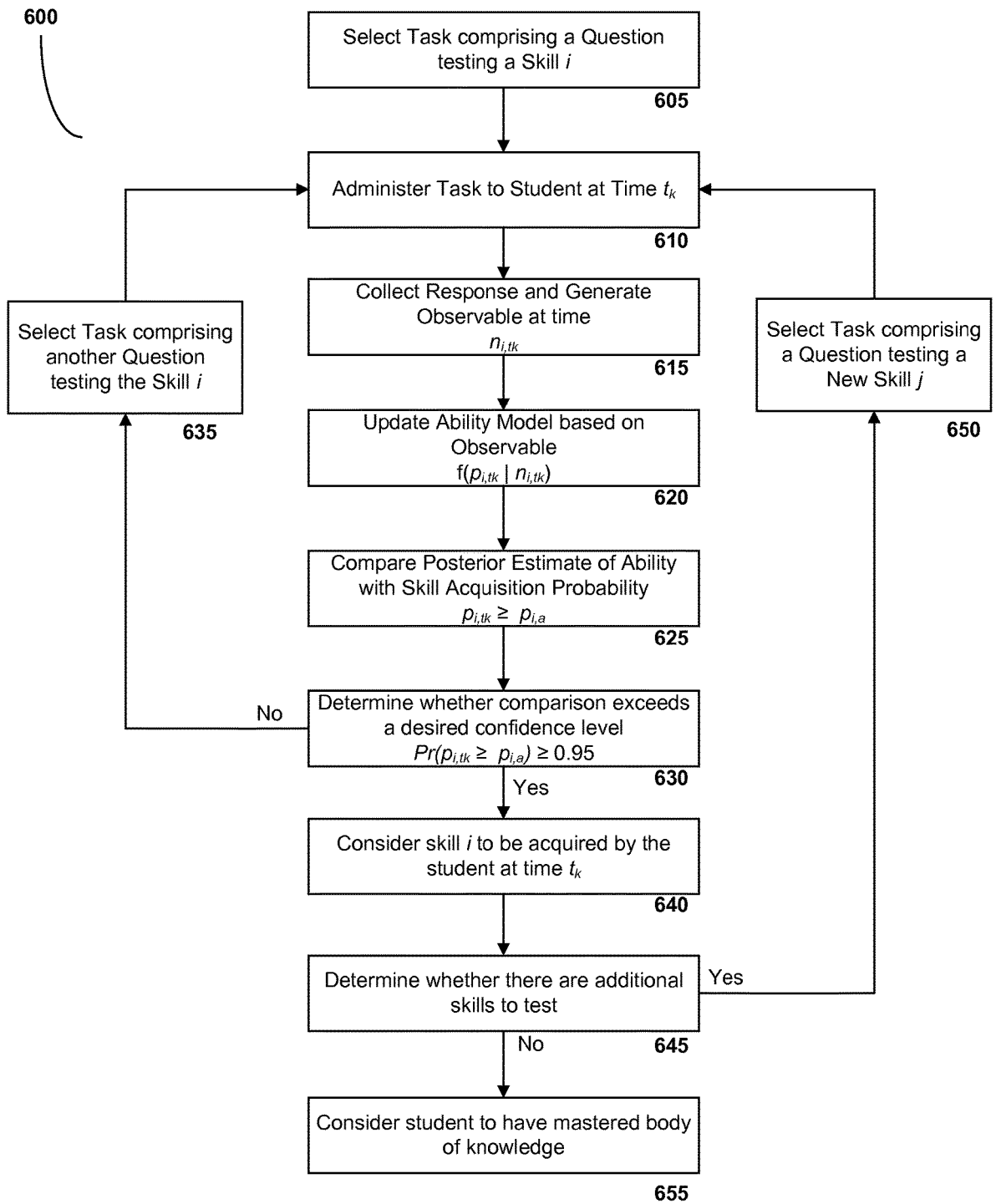

In addition to dynamically adjusting the difficulty level of questions on a test (as in FIG. 5), the above concepts of question difficulty and student ability may be further leveraged to determine at each time point whether a student has acquired a skill, and in turn, whether a student has mastered a body of knowledge. In particular, the binary filter algorithm as described above may be used to evaluate whether a student has acquired a skill or mastered a body of knowledge after responding to each question on a test. FIG. 6 is a flow diagram that illustrates an embodiment of a method 600 of determining whether a student has acquired a skill. The method 600 begins during a test administered by, for example, an assessment agent, such as the assessment agent 122 of FIG. 1. The assessment agent 122 may select a task comprising a question testing a particular skill i (step 605) and may administer the task to a student at a time point $t_k$ (step 610). The student then provides a response to the question, and the assessment agent 122 generates an observable $n_{i,t_k}$ (step 615). The assessment agent 122 may then use the observable to update an ability model, such as the ability model 328 of FIG. 3, to yield a posterior distribution and estimate of student ability $p_{i,t_k}$ with respect to the tested skill at the time point $t_k$ (step 620).

The posterior estimate is then compared with a threshold value, such as a skill acquisition measure or skill acquisition probability, $p_{i,a}$ (step 625). In this embodiment, the skill acquisition probability $p_{i,a}$ represents a specific probability of correctly answering a question testing the skill i that must be achieved by a student for the assessment agent to consider the skill i as mastered or acquired. As previously noted, defining the difficulty of questions probabilistically establishes a principled way to set the skill acquisition probability. For example, the skill acquisition probability may simply be the difficulty of a question on a test (e.g., the difficulty of the question Z as described in FIG. 5). If the assessment agent 122 determines that the student's ability has exceeded the difficulty of the question Z with a sufficient level of confidence (step 630), the assessment agent 122 may consider the skill i tested by the question to be acquired (step 640) because the student has mastered questions testing the skill i having that level of difficulty.

Alternately, the skill acquisition probability may be set as a specific quantile of the distribution of difficulty for the questions provided on a test. For example, the skill acquisition probability may be the $50^{th}$ percentile of the distribution of difficulty of the questions testing a skill on the test. Accordingly, if the questions on a test are quite difficult, then the skill acquisition probability may be set lower than if the questions were relatively easy. The skill acquisition probability may be set automatically, e.g., by the assessment agent, or manually, e.g., by an administrator or instructor. The skill acquisition probability may also vary depending on the particular skill or question currently being tested; for example, an administrator may set a particular skill acquisition probability for each skill of a plurality of skills tested by an examination, which may reflect the varying importance of particular skills within a body of knowledge. In these cases, the skill acquisition probability may exceed the difficulty of a particular question on a test, because a desired level of student ability may be required for a skill to be considered as acquired.

Comparing the posterior estimate of student ability with the skill acquisition probability $p_{i,a}$ may be performed in a similar manner to comparing the posterior estimate of student ability with the difficulty level Z of a question as described above. The assessment agent 122 may perform this comparison by a number of methods, including but not limited to: 1) computing $Pr(p_{i,t_k} > p_{i,a})$ by convolution of the two probability densities; 2) computing $Pr(p_{i,t_k} > p_{i,a})$ using $f(p_{i,t_k}|n_{t_k})$ and $P_{i,a}$; and 3) by assessing whether $\hat{p}_{i,t_k|t_k} > p_{i,a}$. If the posterior estimate of student ability exceeds the skill acquisition probability with a confidence level greater than a sufficient confidence level, e.g., 0.95, (step 630), then the assessment agent considers the skill to have been acquired by the student at time $t_k$ (step 640). If not, another task comprising a question testing the same skill may then be administered to the student (step 635). However, if the student has acquired the skill, then the assessment agent may next determine whether there are additional skills within the body of knowledge not yet acquired by the student (step 645). If there are additional skills not yet mastered, the assessment agent selects a question testing a new skill j (step 650) and administers the corresponding task to the student (step 610). However, if the student has acquired each of the skills within the body of knowledge, then the assessment agent considers the student to have mastered that body of knowledge (step 655). Accordingly, the assessment agent may then end the test.

The assessment agent or test administrator may then determine whether the student has acquired the skill with a desired level of certainty after taking k questions, a subset of which will be relevant to skill i, if the probability that $p_{i,t_k}$ is greater than $p_{i,a}$ is greater than or equal to 95% (or some other threshold value), for example $Pr(p_{i,t_k} \geq p_{i,a})$ 0.95 (step 630). In other words, at time point $t_k$, the student has acquired the skill i if the lower 95% credibility bound of $p_{i,t_k}$ is greater than or equal to $p_{i,a}$. Equation (19) may be used to explicitly compute the probability that $p_{i,t_k}$ is greater than or equal to $p_{i,a}$, or $Pr(p_{i,t_k} \geq p_{i,a})$. As the student responds to each question at each time point $t_k$, $Pr(p_{i,t_k} \geq p_{i,a})$ may be evaluated to determine whether this probability is at least a sufficient confidence level, such as 0.95, and thus whether the skill was first acquired at time point $t_k$. In some embodiments, multiple confirmations may be required to ensure that the student has acquired a skill. For example, if the probability that a student has acquired a skill remains above 0.95 for at least 3 subsequent consecutive questions or time points in which skill i is tested, then further confirmation exists that the skill has been acquired. Once all of the skills within a body of knowledge have been acquired, the subject has thus mastered that concept or body of knowledge (step 655). If more or less certainty for skill acquisition is desired, then one may consider skill acquisition to require a threshold value of at least 0.99 or 0.90, respectively, or any other value.

Various combinations of dynamically adjusting the difficulty of questions on a test in response to an estimate of student ability (e.g., the method 500 of FIG. 5) and determining whether a student has acquired a skill and selecting questions testing other skills in response (e.g., the method 600 of FIG. 6) may be performed in the context of a learning system according to the disclosure. For example, an embodiment of the disclosure may test only a single skill, and therefore only adjust question difficulty in response to posterior estimates of student abilities. Another embodiment of the disclosure may test a plurality of skills comprising a body of knowledge and determine whether a student has acquired a skill, but may not change the question difficulty. Certain embodiments may vary question difficulty and determine skill acquisition. Still a further embodiment may simply track student performance and ability for later analysis or for grading, but not take any dynamic actions in response after each time point. Various embodiments and configurations of the above systems and methods are considered to be within the scope of the disclosure.

Real-Time Analysis and Guided Learning

As described above, the systems and methods of the disclosure may be used to perform a real-time analysis of learning and skill acquisition. Further, the systems and methods may be used to perform guided learning. For example, as described above, in certain embodiments, a learning system according to the disclosure may select questions having different levels of difficulty or testing skills in response to dynamic and real-time estimates of student ability. Accordingly, embodiments of the present disclosure may comprise a closed-loop real-time feedback control system for guided on-line learning that uses real-time dynamic assessments of a student's ability or proficiency with respect to a skill at each time point to intelligently choose the sequence of questions to be posed based on a pre-defined learning objective and the student's evolving performance.

In further embodiments, a learning system may further provide the correct response to a student after each time point $t_k$, thus creating an opportunity to teach the student during a test. In this way, the student may learn from previous mistakes and incorrect answers, which may improve the student's ability to respond correctly to future questions. Further, real-time analyses increase the efficiency of testing, as once skills have been considered to be acquired, there is no longer a need to administer questions related to that skill on a test. Thus, real-time analysis and guidance according to embodiments of the disclosure may be used to dynamically adjust the length of a test and therefore the amount of time required to complete the test.

Retrospective Analyses

In addition to real-time analyses, data may be analyzed retrospectively once a subject has completed an examination. In one embodiment, a state-space smoothing algorithm for the binary filter algorithm of Equations (12)-(16) may be used to analyze the cognitive state at any time $t_k$ given the all of the data from time point $t_0$ to T. The smoothing algorithm comprises:

$$A_{t_k} = F \Sigma_{t_k|t_k} \Sigma_{t_{k-1}|t_k}^{-1} \tag{20}$$

$$x_{t_k|T} = x_{t_k|t_k} + A_{t_k}(x_{t_{k+1}|T} - x_{t_{k+1}|t_k}) \tag{21}$$

$$\Sigma_{t_k|T} = x_{t_k|t_k} + A_{t_k}(\Sigma_{t_{k+1}|T} - \Sigma_{t_{k+1}|t_k}) A'_{t_k} \tag{22}$$

$$p_{i,t_k|T} = [1 + \exp(x_{i,t_k|T})]^{-1} \exp(x_{i,t_k|T}), \tag{23}$$

Thus, an embodiment of the disclosure utilizing a retrospective analysis allows for the computation at each time $t_k$ the probability of a correct response given all of the data observed during a test. In some embodiments, these data may be visualized or graphed to provide measures for administrators and other teachers to evaluate student performance and skill acquisition, for example, after a course has concluded.

Privacy

As noted previously, the binary filter algorithm of Equations (12)-(16) is computationally efficient, and therefore may be run on inexpensive or commodity computing hardware. This feature has many benefits. For example, for learning systems in which privacy is desired, all or portions of the systems and methods described herein may be implemented locally on a mobile device, cell phone, personal computer, or other form of computing device. Responses and observables may be scored, estimates of difficulty and ability may be estimated, and determinations of skill acquisition and difficulty mastery may be performed or executed locally, rather than on an external server or device. In this way, a student maintains control of his or her responses and may choose to keep them private from other parties. In some embodiments, results regarding individual performance may only be shared with an external or master server when it has been agreed to by the student, such as in an end user license agreement or privacy setting. The option of privacy is a feature uniquely enabled by the computational efficiency of the binary filter algorithm and other embodiments of the disclosure.

However, it should be noted that where privacy is not a concern or permission has been granted, information gathered using the above systems and methods, such as responses to questions, may be pooled from a plurality of students and/or cohorts. This information may then be used to provide a precise definition of difficulty of a question by, for example, using the method 400 of FIG. 4. In certain embodiments, information may be de-identified, for example, by removing identifying information associated with the student, prior to use for difficulty calibration by learning systems according to the disclosure.

Embodiments of the disclosure may be utilized for various educational purposes. For example, a preparatory course for an examination, such as the SAT, ACT, GRE, AMCAS, and the LSAT, could utilize an embodiment of the disclosure to predict a student's ability with respect to a plurality of skills. For example, for a preparatory course for the SAT, the skills may comprise critical reading, vocabulary, passage completion, basic arithmetic, algebra, and geometry. As a student enrolled in the preparatory course responds to questions testing these skills, an estimate of the student's ability for each skill may be updated using an ability model. If the student has mastered a skill, the next question may be related to a skill in which the student has not yet mastered, thus focusing the student's attention in an efficient manner. Moreover, the difficulty of questions may be adjusted to match the student's current ability, preventing the student from becoming frustrated by the questions that are too difficult. Furthermore, estimates of student ability and cognitive state may be used to predict the student's ultimate performance on the actual examination. Once the student has achieved a sufficient estimate of student ability, the student can be confident that he or she has sufficiently prepared. However, the student should be careful to not let too much time pass between the end of studying and the examination, as the student's cognitive state may change during that time. Embodiments of the disclosure may similarly be used by various educational and learning systems to both teach and evaluate students.

Further, it should be noted that various features of the above embodiments and disclosure may be combined with one another to form various learning systems. The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A method for analyzing the learning of a student, comprising:
   administering a task to a student, the task comprising a question having a corresponding difficulty;
   receiving a response to the question from the student; and
   by an assessment agent executing on a processor:
   evaluating the response and generating an observable, the observable comprising information related to the response;
   calculating a posterior determination of the student's ability by incorporating the observable into an ability model corresponding to the student, wherein the ability model is a state-space model, and calculating the posterior determination of the student's ability by incorporating the observable into the ability model comprises computing a binary filter algorithm;
   comparing the posterior determination of the student's ability with a threshold value; and
   administering a second task to the student, the second task chosen based on the result of the comparison.

2. The method of claim 1, wherein comparing the posterior determination of the student's ability with a threshold value comprises comparing the posterior determination of the student's ability with the difficulty of the question.

3. The method of claim 2, wherein the observable further comprises information related to previous responses by the student to previous questions.

4. The method of claim 2, wherein the observable further comprises information related to whether the student has provided a correct response or an incorrect response.

5. The method of claim 4, wherein the student's ability comprises the probability that the student will provide a correct response to the question.

6. The method of claim 1, wherein the question is related to a first skill, the posterior determination of student ability comprises a probability that the student will provide a correct response to a question related to the first skill, and calculating a posterior determination of the student's ability by incorporating the observable into an ability model corresponding to the student comprises calculating a posterior determination of the student's ability with respect to the first skill by incorporating the observable into an ability model corresponding to the student and the first skill.

7. The method of claim 6, wherein the first skill is selected from a plurality of skills comprising a body of knowledge.

8. The method of claim 6, wherein comparing the posterior determination of the student's ability with a threshold value comprises comparing the posterior determination of the student's ability with a skill acquisition probability for the first skill, the method further comprising:
   determining whether the student has acquired the first skill.

9. The method of claim 8,
   wherein if it is determined that the student has acquired the first skill, the second task comprises a second question related to a second skill; and
   wherein if it is determined that the student has not acquired the first skill, the second task comprises a second question related to the first skill.

10. The method of claim 2,
    wherein if the posterior determination of student ability exceeds the difficulty of the question, the second task comprises a second question having an increased difficulty; and
    wherein if the posterior determination of student ability does not exceed the level of difficulty of the question, the second task comprising a second question having the same difficulty as the first question.

11. The method of claim 2, wherein a difficulty model corresponds to each question, and further comprising estimating the difficulty of the question prior to administering the task to a student.

12. The method of claim 11, wherein the difficulty of a question represents the probability that a plurality of students will provide a correct response to the question.

13. The method of claim 11, wherein a plurality of difficulty models correspond to each question, wherein each difficulty model of the plurality of difficulty model relates to at least one of a student, cohort, and skill.

14. The method of claim 11, wherein estimating the difficulty of the question prior to administering the task to a student comprises:
    receiving a plurality of responses to the question, the plurality of responses representing answers to the question from a plurality of students;
    evaluating the responses to generate a plurality of observables, the plurality of observables information related to the number of correct responses to the question and the number of incorrect responses to the question; and
    calculating a posterior determination of the difficulty of the question by incorporating the plurality of observables into a difficulty model for the question.

15. A system for analyzing student learning, comprising:
    a storage device comprising:
    a plurality of questions, each question of the plurality of questions related to a skill and having a difficulty, the difficulty representing the probability that a plurality of students will provide a correct response to the question, the difficulty estimated by a difficulty model;
    an assessment agent executing on a processor and configured to:
    administer a task of the plurality of tasks to a student, the task comprising a question of the plurality of questions;
    receive a response to a question of the administered task from the student;
    evaluate the response and generate an observable, the observable comprising information related to the response and information related to previous responses by the student to previous questions, the information related to the response further comprising information related to whether the student has provided a correct response or an incorrect response;
    calculate a posterior determination of the student's ability with respect to the skill by incorporating the observable into an ability model corresponding to the student and the skill, the posterior determination of the student's ability comprising the probability that the student will provide a correct response to a question related to the skill;
    compare the posterior determination of the student's ability with respect to the skill with the difficulty of the question; and
    administer a second task to the student, the second task chosen based on the result of the comparison.

16. The system of claim 15, wherein the ability model is a state-space model, and calculating a posterior determination of the student's ability by incorporating the observable into an ability model comprises computing a binary filter algorithm.

17. The method of claim 1, wherein a difficulty model corresponds to each question, and wherein the difficulty model comprises a beta-binomial model.

18. The system of claim 15, wherein the difficulty model comprises a beta-binomial model.

\* \* \* \* \*

UNITED STATES PATENT AND TRADEMARK OFFICE
CERTIFICATE OF CORRECTION

| | | |
|---|---|---|
| PATENT NO. | : 10,885,803 B2 | Page 1 of 1 |
| APPLICATION NO. | : 14/603593 | |
| DATED | : January 5, 2021 | |
| INVENTOR(S) | : Brown et al. | |

It is certified that error appears in the above-identified patent and that said Letters Patent is hereby corrected as shown below:

In the Specification

In Column 1, Line 3, after title "SYSTEM AND METHOD FOR REAL-TIME ANALYSIS AND GUIDANCE OF LEARNING" insert heading & paragraph:
--GOVERNMENT SUPPORT
This invention was made with government support under GM104948 awarded by the National Institutes of Health. The government has certain rights in the invention.--

Signed and Sealed this
Eleventh Day of November, 2025

John A. Squires
*Director of the United States Patent and Trademark Office*